United States Patent
Holzer et al.

(10) Patent No.: US 10,861,213 B1
(45) Date of Patent: Dec. 8, 2020

(54) SYSTEM AND METHOD FOR AUTOMATIC GENERATION OF ARTIFICIAL MOTION BLUR

(71) Applicant: Fyusion, Inc., San Francisco, CA (US)

(72) Inventors: Stefan Johannes Josef Holzer, San Mateo, CA (US); Matthias Reso, San Francisco, CA (US); Pavel Hanchar, Minsk (BY); Radu Bogdan Rusu, Berkeley, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 16/726,214

(22) Filed: Dec. 23, 2019

(51) Int. Cl.
| | |
|---|---|
| *G06T 15/00* | (2011.01) |
| *G06T 5/00* | (2006.01) |
| *G06T 7/11* | (2017.01) |
| *G06T 7/20* | (2017.01) |
| *G06N 3/02* | (2006.01) |

(52) U.S. Cl.
CPC ............... *G06T 15/00* (2013.01); *G06N 3/02* (2013.01); *G06T 5/002* (2013.01); *G06T 7/11* (2017.01); *G06T 7/20* (2013.01); *G06T 2207/10016* (2013.01); *G06T 2207/20044* (2013.01); *G06T 2207/20084* (2013.01); *G06T 2207/30252* (2013.01)

(58) Field of Classification Search
CPC .......... G06K 9/00664–00704; G06K 9/00671; G06K 9/6253; G06F 3/0481; G06F 3/04817; G06F 9/4443; G06F 3/04847; G06F 11/3664; G06F 3/0304; G06F 3/011–015; G06F 3/04815; G06F 3/04845; G06F 9/44458; G06T 19/00; G06T 17/00; G06T 19/006; G06T 2215/16; G06T 15/205; G06T 19/003; G06T 7/285; G06T 11/60; G06T 11/001; G06T 15/04; G06T 15/005; H04N 5/272; H04N 2201/3245; H04N 13/111; H04N 5/44504; A63F 13/10; G09G 5/14; G09G 2340/10; G09G 2340/125; G09G 5/363

See application file for complete search history.

(56) References Cited

U.S. PATENT DOCUMENTS

| | | | |
|---|---|---|---|
| 9,470,904 B2 * | 10/2016 | Nanba ................... | G02B 15/173 |
| 9,939,634 B2 * | 4/2018 | Aoki ....................... | G02B 15/14 |

* cited by examiner

*Primary Examiner* — Todd Buttram
(74) *Attorney, Agent, or Firm* — Kwan & Olynick LLP

(57) ABSTRACT

Systems and methods for automatic generation of artificial motion blur are provided. The method includes obtaining a sequence of images of an object captured along a camera translation. Then, a multi-view interactive digital media representation (MIDMR) of the object is generated. Generating the MIDMR includes segmenting the object and then adding a blur effect to all parts of the MIDMR except for the segmented object.

20 Claims, 35 Drawing Sheets

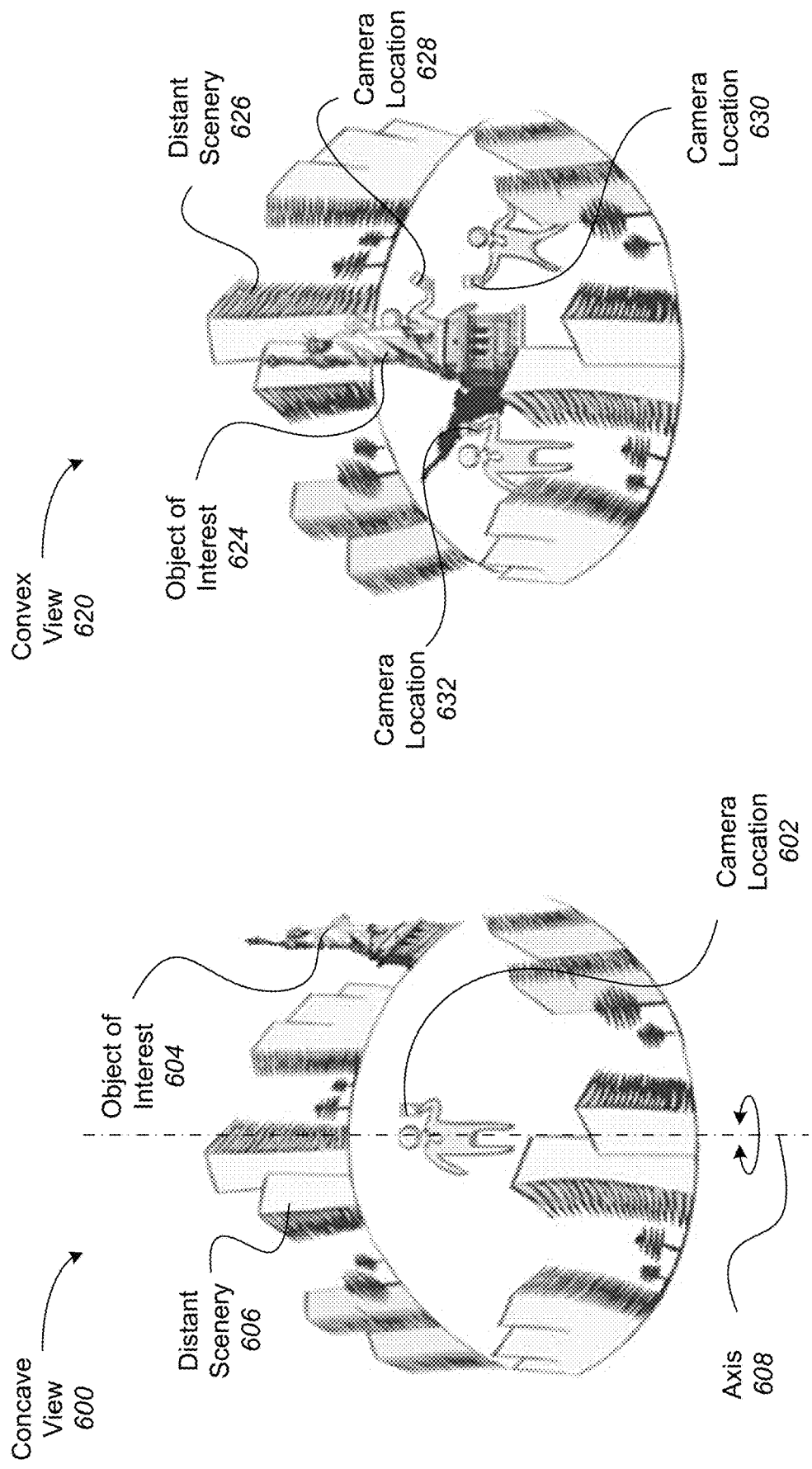

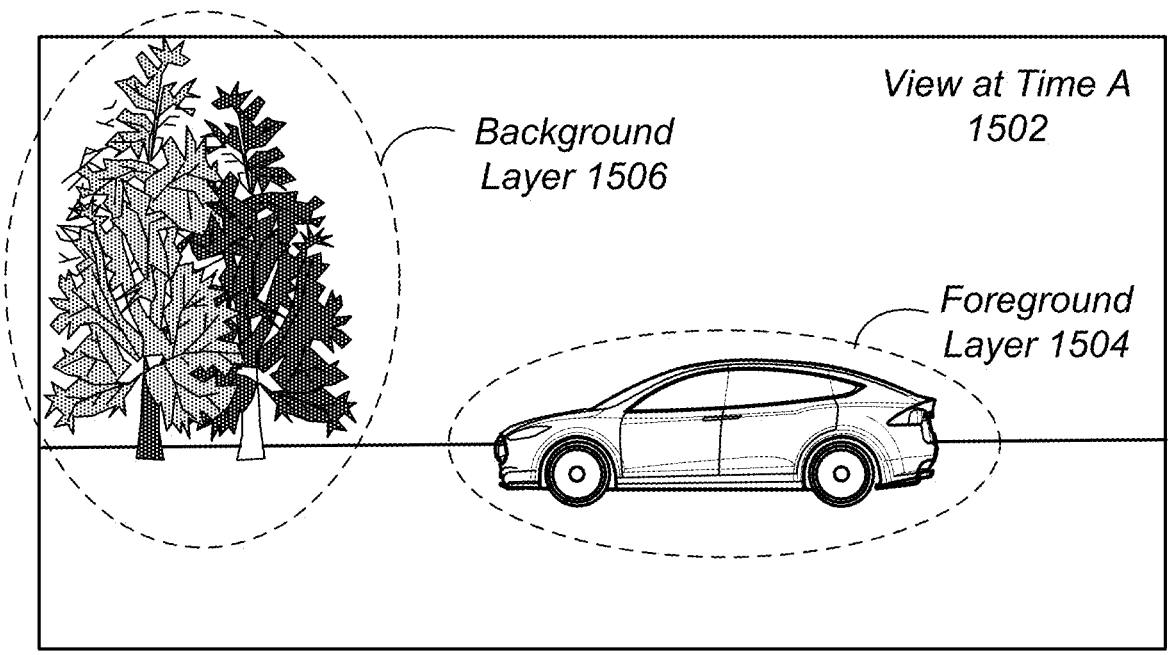
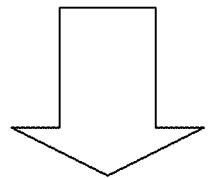
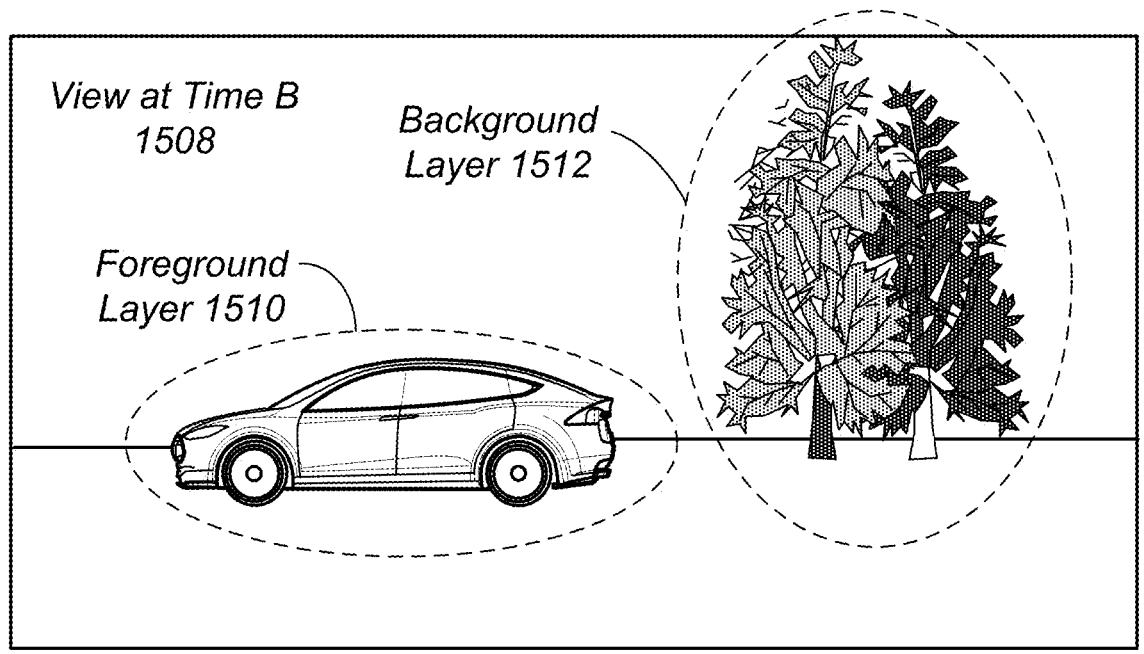
FIG. 15

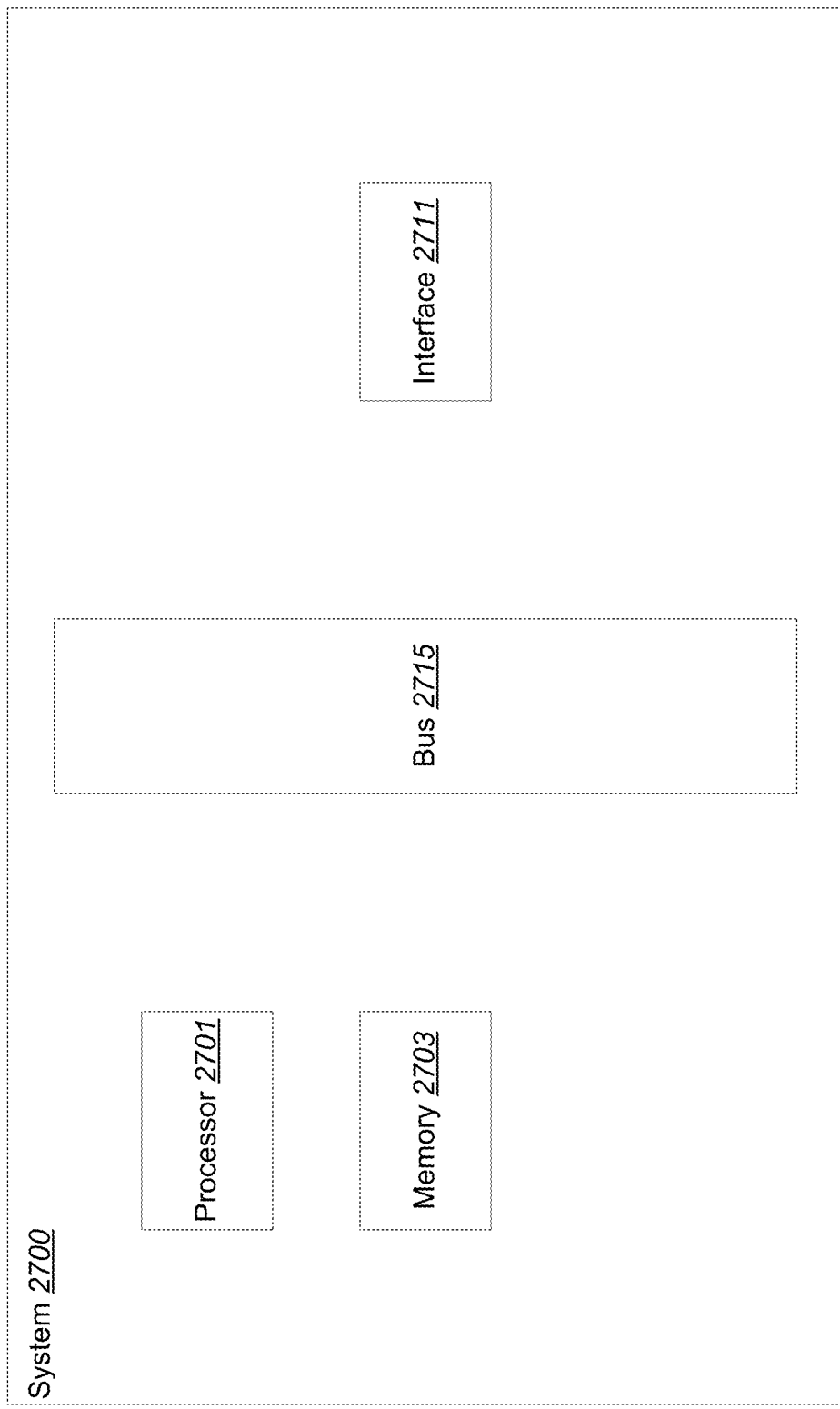

SYSTEM AND METHOD FOR AUTOMATIC GENERATION OF ARTIFICIAL MOTION BLUR

TECHNICAL FIELD

The present disclosure relates generally to the multi-view interactive media representations, and more specifically to generating artificial motion blur.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). Other existing methods of producing 3D models may be done by computer generation of polygons or texture mapping over a three-dimensional mesh and/or polygon models, which also require high processing times and resources. This limits the efficiency of these methods in processing speed as well as transfer rates when sending it over a network. The problems are exacerbated when trying to produce 3D content representations against a moving background. Accordingly, improved mechanisms for extrapolating and presenting clear 3D image content data amidst a moving background are desirable.

SUMMARY

The following presents a simplified summary of the disclosure in order to provide a basic understanding of certain examples of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Provided are various mechanisms and processes relating to automatic generation of artificial motion blur are provided. In one aspect, a method includes obtaining a sequence of images containing an object captured along a camera translation. Then, a multi-view interactive digital media representation (MIDMR) of the object is generated. The MIDMR including a plurality of views of the object and each view includes a camera angle. Generating the MIDMR includes, for each view: semantically segmenting the object from an image corresponding to the view, thereby forming a segmented object; refining the segmented object images using fine-grained segmentation; computing a gravity vector for the segmented object; determining a ground plane of the segmented object using the gravity vector; drawing a circle on the ground plane around the segmented object using a predetermined radius; defining a directionality of the segmented object; selecting two blur center candidates along the 3D circle; choosing a blur center among the two blur center candidates based on a predetermined criteria; and applying a blur effect along the directionality of the segmented object to every part of the view except where the segmented object.

In some embodiments, each blur center candidate is located along a line that passes through the center of the segmented object and is parallel to the directionality of the segmented object. In some embodiments, choosing the blur center includes choosing the blur center candidate with the smallest angle difference between a vector from the center of the segmented object to the blur center candidate and the camera angle of the view. In some embodiments, the predetermined radius is determined empirically. In some embodiments, semantically segmenting the object from the sequence of images is done using a trained neural network. In some embodiments, refining the sequence of segmented object images is performed using segmentation windows along an outline of the object representation. In some embodiments, the gravity vector is computed using IMU data. In some embodiments, the directionality of the segmented object is determined by first generating a skeleton of the segmented object and then using a portion of the skeleton to find the directionality. In some embodiments, the directionality of the segmented object is determined by using a trained neural network. In some embodiments, the object is a car and the directionality is determined by using two or more wheels of the car.

Other aspects of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular examples of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIGS. 6A-6B illustrate examples of concave view and convex views, respectively, where both views use a back-camera capture style.

FIG. 15 illustrates an example of combining image information gathered from two frames to artificially render an image in another frame using multiple layers extracted from surround views, in accordance with one or more embodiments.

FIG. 27 illustrates a particular example of a computer system that can be used with various embodiments of the present disclosure.

DETAILED DESCRIPTION

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

As used herein, the term "surround view" will be used synonymously with "multi-view interactive digital media representation" (MIDMR).

Figure 1:
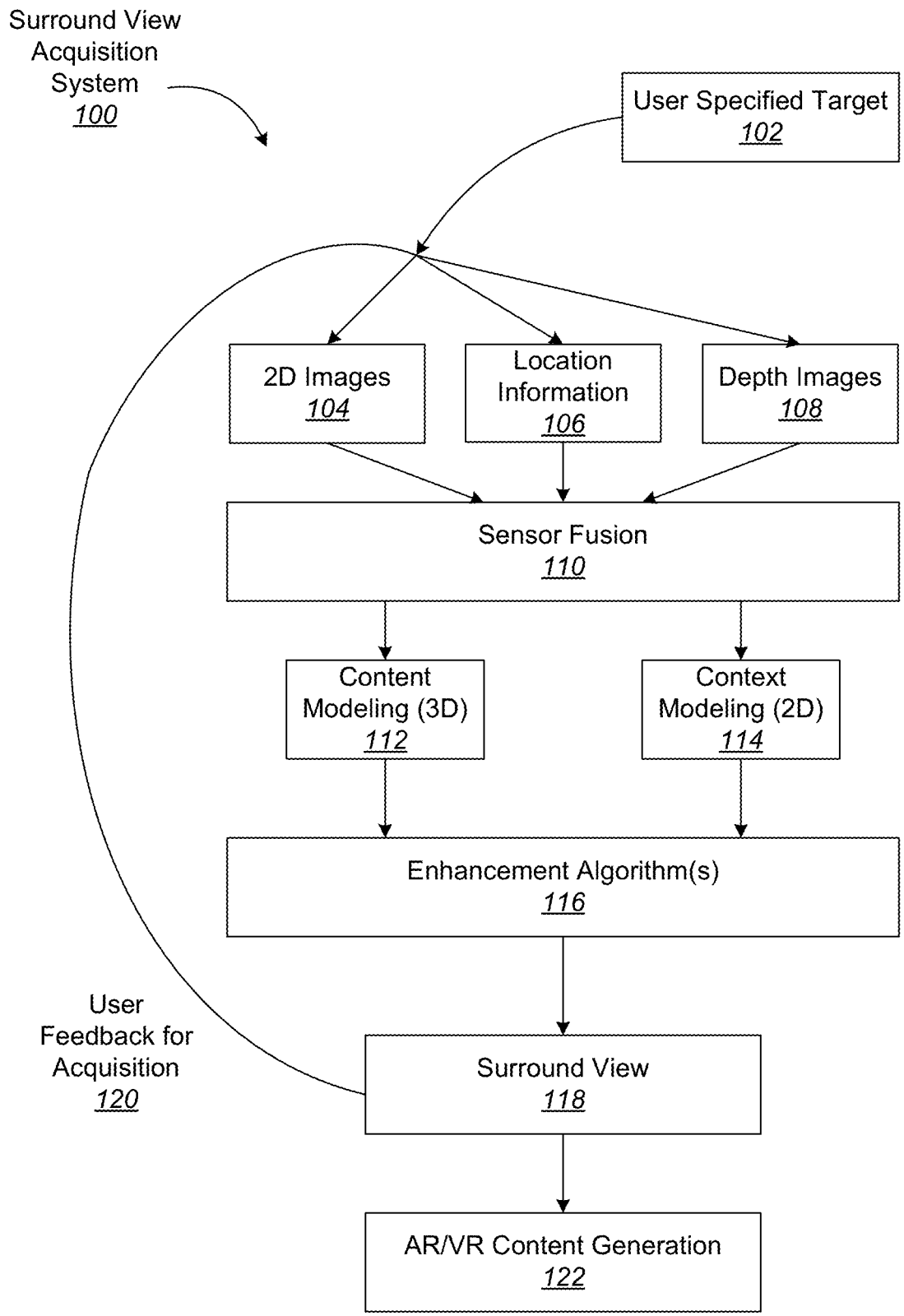
FIG. 1 illustrates an example of a surround view acquisition system, in accordance with one or more embodiments.

According to various embodiments of the present disclosure, a surround view is a multi-view interactive digital media representation. With reference to FIG. 1, shown is one example a system 100 for generating a surround view. In the present example embodiment, the system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 5, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 4.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, image stabilization can be used for a surround view in a manner similar to that used for video. In particular, keyframes in a surround view can be stabilized for to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. A RANSAC (random sample consensus) algorithm may then be implemented to determine a number of the most common occurring transformations possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

The surround view 118 may further be processed at AR/VR content generation block 122 to create content for various AR/VR systems. Such AR/VR content block 122 may comprise a processing module which can segment the images to extract an object of interest and/or background imagery through semantic segmentation and/or fine-grained segmentation further described with reference to FIGS. 11 and 12, respectively. Further enhancement algorithms may be implemented at AR/VR content generation block 122, such as those described with reference to block 116. For example, view interpolation may be applied to determine parameters for any number of artificial intermediate images to result in an infinitely smooth transition between image frames, as further described with reference to FIGS. 13-21. Furthermore, stereoscopic pairs of image frames may be determined, which can be presented to the user to provide a perception of depth, as further described with reference to FIGS. 22-24. The indexes for the image frames may further be mapped to the rotation range of the camera translation, allowing image frames to correspond to the position of a user and/or viewing device.

Figure 2:
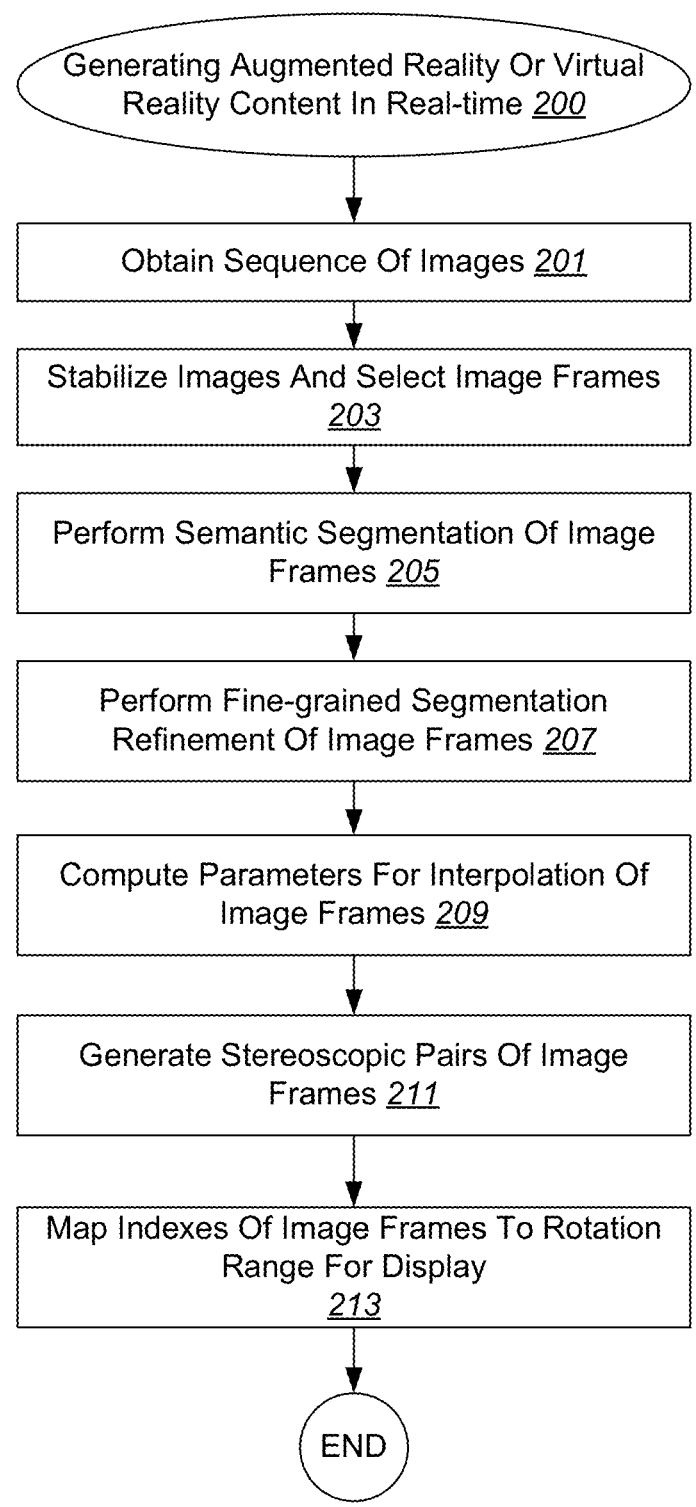
FIG. 2 illustrates an example of a process flow for real-time AR/VR content capture and generation, in accordance with one or more embodiments.

With reference to FIG. 2, shown is an example of a method 200 for generating augmented reality and/or virtual reality content in real-time. In various embodiments, method 200 utilizes system 100 and/or various methods described with respect to process 300 described below. In some embodiments, method 200 may be a process performed at AR/VR content generation block 122. Method 200 may produce AR/VR content that provides a user with a three-dimensional surround view of an object of interest with depth.

At step 201, a sequence of images is obtained. In some embodiments, the sequence of images may include 2D images, such as 2D images 104. In some embodiments, other data may also be obtained from the camera and/or user, including location information, such as location information 106, as well as depth information. At step 203, the images are stabilized and a set of image frames are selected. The selected image frames may be referred to as keyframes. Such keyframes may be processed into a surround view through content modeling 112, context modeling 114, and/or enhancement algorithms 116, as described above with reference to FIG. 1.

According to various aspects of the present disclosure, AR/VR content is further generated by extracting an object of interest or other content, such as a person, within a sequence of images to separate it from the background and other context imagery. This may be achieved by applying various segmentation algorithms and processes to the images. In an example embodiment, semantic segmentation of the keyframes is performed to separate the foreground from the background of the image within each keyframe at step 205. Such semantic segmentation may be performed by a segmenting neural network trained to identify and label pixels within each image frame. Semantic segmentation is further described below with reference to FIG. 11. Furthermore, fine-grained segmentation refinement of the keyframes may be performed at step 207. Step 207 may enhance and/or improve the separation of foreground from the background such that the object of interest is clearly and cleanly isolated without artifacts corresponding to the background. Fine-grained segmentation is further described below with reference to FIG. 12.

At step 209, parameters for interpolation of keyframes are computed. In some embodiments, parameters for interpolation may be determined by determining a number of likely transformations and applying the optimal transformation to each pixel within an image frame. In some embodiments, such parameters may be determined offline and used to render images at runtime when the surround view is viewed by a user. Interpolation of keyframes and rendering of artificial frames are further described below with reference to FIGS. 13-21. According to various methods described herein, any number of image frames may be rendered between two keyframes of the surround view based on the location of the user and/or viewing device, which provides a viewpoint at any location around an object of interest, as well as a smooth transition between keyframes.

At step 211, stereoscopic pairs of image frames are generated. In some embodiments, stereoscopic pairs may be generated by determining the pair of frames that will a desired perception of depth based on the distance of the camera to the object of interest and an angle of vergence. In some embodiments, one or more image frames within a stereoscopic pair may include an artificially interpolated image. In some embodiments, one or more image frames within a stereoscopic pair may be corrected by applying a rotation transformation such that the line of site is perpendicular to the plane of the image frame. Generation of stereoscopic pairs is further described below with reference to FIGS. 22-24.

At step 213, indexes of the image frames are mapped to a rotation range for display. In some embodiments, the rotation range may be concave arc around an object of interest. In other embodiments, the rotation range may be a convex image rotation. Various rotation ranges may correspond to the various types of camera translations and positions described with reference to FIGS. 4, 6A-6B, 7A-7E, 8 and 9. For example, in an image sequence of 150 images, the leftmost frame in a captured image sequence may be keyframe 0, and the last frame corresponding to the end of the camera translation may be keyframe 150. In some embodiments, the captured frames or selected keyframes may be uniformly distributed along the rotation range. In other embodiments, they may be distributed based on location and/or other IMU data.

In various embodiments, the physical viewing location is matched to the frame index. Thus, if a user and/or viewing device is at the middle of the rotation range, then an image frame corresponding to the middle of the rotation range should be displayed. In some embodiments, such information is loaded into a viewing device, such as headset 2500, described with reference to FIG. 25. Thus, based on the position of the headset 2500, the appropriate image and/or stereoscopic pair of images may be displayed to the user.

In various embodiments, AR/VR content generated by process flow 200 can include an object of interest which may be viewed by a user as a three-dimensional model from various angles and/or viewpoints. In some embodiments, the surround view model is not an actual three-dimensional model that is rendered, but a three-dimensional view experienced as a three-dimensional model model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Surround View Generation

Figure 3:
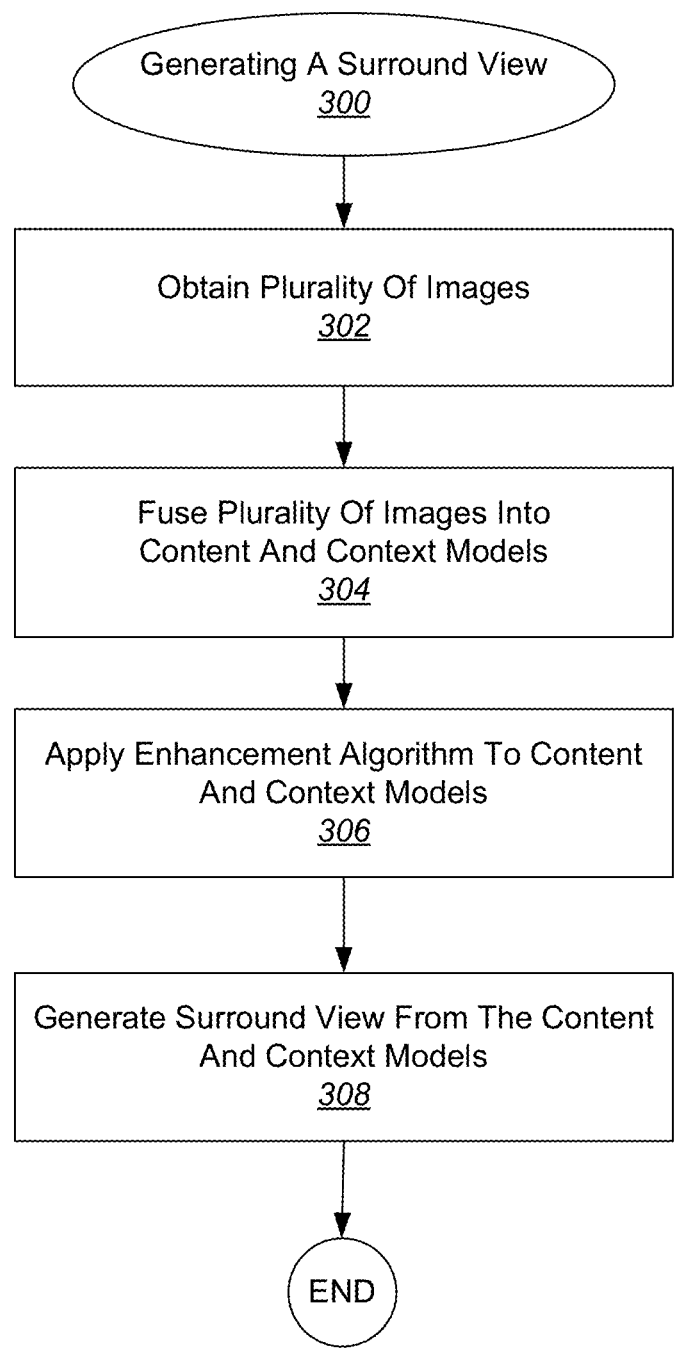
FIG. 3 illustrates an example of a process flow for generating a surround view, in accordance with one or more embodiments.

With reference to FIG. 3, shown is illustrates an example of a process flow for generating a surround view. In the present example, a plurality of images is obtained at 302. According to various embodiments, the plurality of images may be various types of images obtained by various types of cameras. For example, a camera may be a digital camera in a continuous shooting mode (or burst mode) configured to capture a number of frames in a certain amount of time, such as five frames per second. In other embodiments, the camera may be a camera on a smartphone. In some embodiments, the camera may be configured to capture the plurality of images as a continuous video.

According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

According to various embodiments, the plurality of images obtained at 302 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 304. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 306. These algorithms can be used to enhance the user experience. For instance, enhancement algorithms such as automatic frame selection, stabilization, view interpolation, image rotation, infinite smoothing, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 308. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application. In some embodiments, the surround view model is not an actual three-dimensional model that is rendered, but a three-dimensional view experienced as a three-dimensional model model by the user. For example, the surround view provides a three-dimensional view of the content without rendering and/or storing an actual three-dimensional model.

Figure 4:
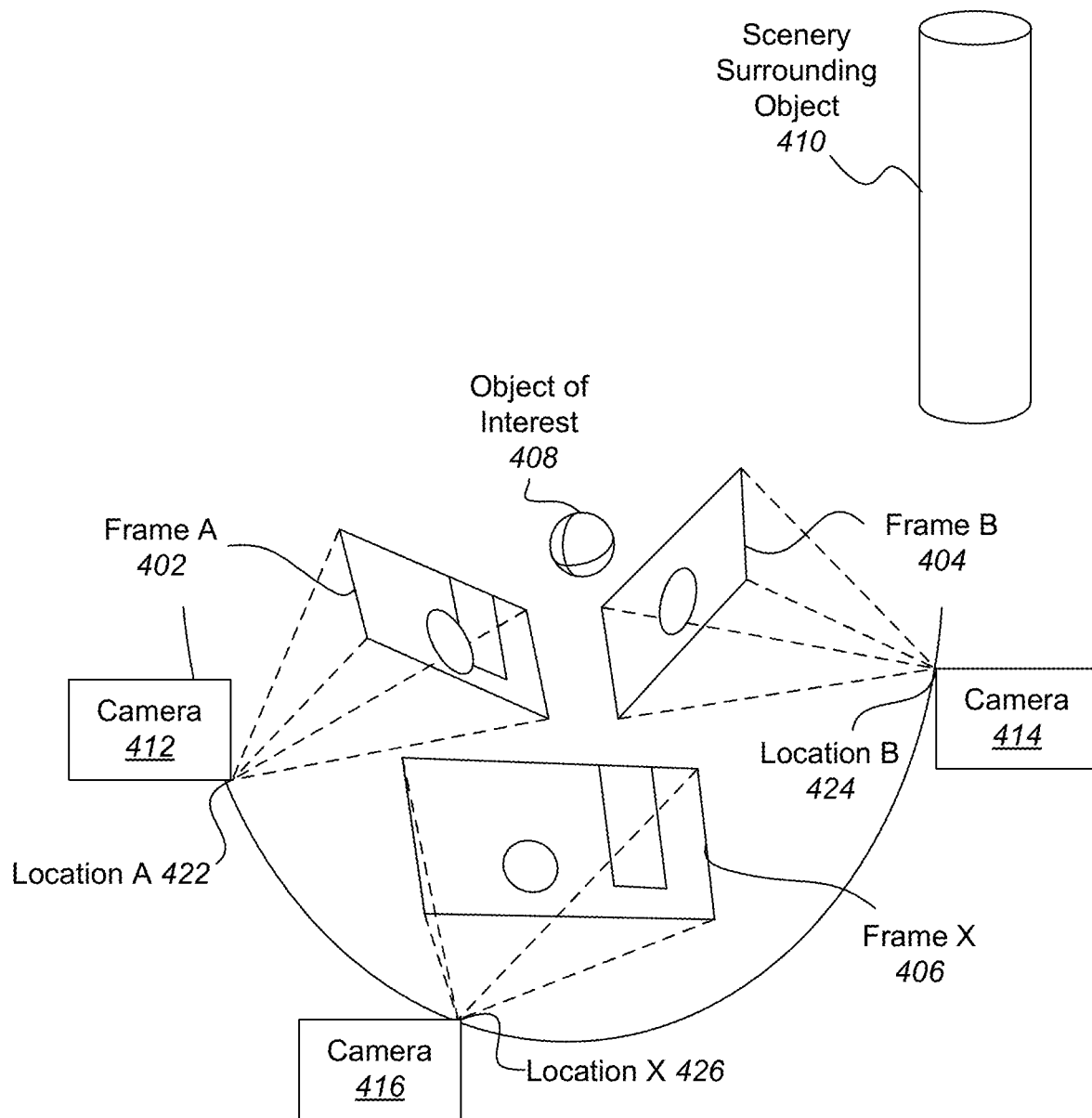
FIG. 4 illustrates one example of multiple camera views that can be fused into a three-dimensional (3D) model to create an immersive experience, in accordance with one or more embodiments.

With reference to FIG. 4, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 412, 414, and 416 are positioned at location A 422, location B 424, and location X 426, respectively, in proximity to an object of interest 408. Scenery can surround the object of interest 408 such as object 410. Frame A 402, frame B 404, and frame X 406 from their respective cameras 412, 414, and 416 include overlapping subject matter. Specifically, each frame 402, 404, and 406 includes the object of interest 408 and varying degrees of visibility of the scenery surrounding the object 410. For instance, frame A 402 includes a view of the object of interest 408 in front of the cylinder that is part of the scenery surrounding the object 410. View 406 shows the object of interest 408 to one side of the cylinder, and view 404 shows the object of interest without any view of the cylinder.

In the present example embodiment, the various frames, frame A 402, frame B 404, and frame X 416, along with their associated locations, location A 422, location B 424, and location X 426, respectively, provide a rich source of information about object of interest 408 and the surrounding context that can be used to produce a surround view. For instance, when analyzed together, the various frames 402, 404, and 426 provide information about different sides of the object of interest and the relationship between the object of interest and the scenery. According to various embodiments, this information can be used to parse out the object of interest 408 into content and the scenery as the context. Furthermore, as also described above with regard to FIGS. 1 and 2, various algorithms can be applied to images produced by these viewpoints to create an immersive, interactive experience when viewing a surround view.

In some embodiments Frame X 406 may be an artificially rendered image that is generated for a viewpoint at Location X 426 on a trajectory between Location A 422 and Location B 424. In such example, a single transform for viewpoint interpolation is used along the trajectory between two frames, Frame A 402 and Frame B 404. As previously described, Frame A 402 represents an image captured of objects 408 and 410 by a camera 412 located at Location A 422. Frame B 404 represents an image captured of object 408 by a camera 414 located at Location B 424. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 426, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 402 to Frame X 406 based on T_AX and by transferring image information from Frame B 404 to Frame X 406 based on T_XB. Finally, the image information gathered from both Frames A and B is combined to generate an artificially rendered image at Location X 426. Interpolation to render artificial frames is further described below with references to FIGS. 13-21.

Figure 5:
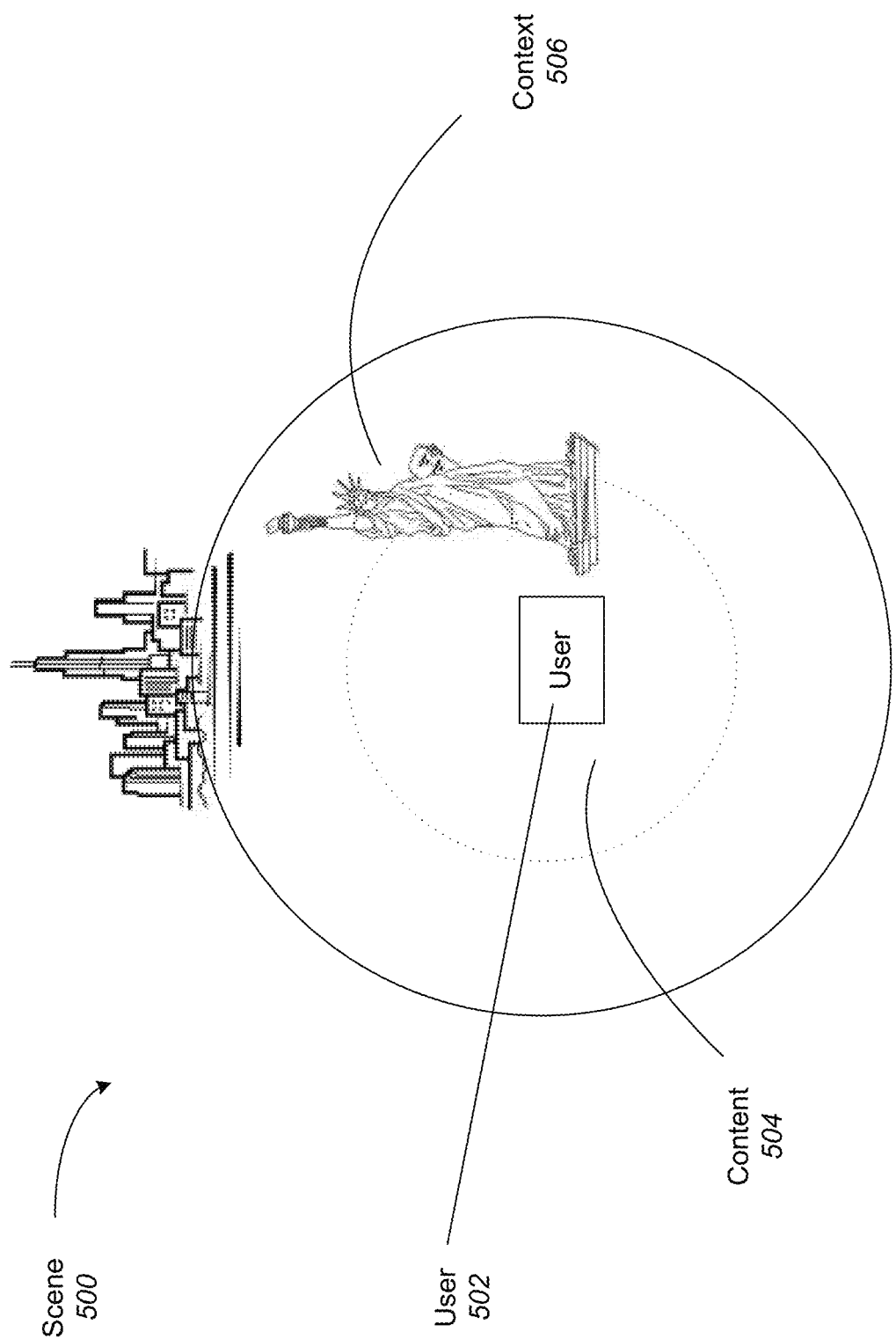
FIG. 5 illustrates one example of separation of content and context in a surround view, in accordance with one or more embodiments.

FIG. 5 illustrates one example of separation of content and context in a surround view. According to various embodiments of the present disclosure, a surround view is a multi-view interactive digital media representation of a scene 500. With reference to FIG. 5, shown is a user 502 located in a scene 500. The user 502 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 504 and context 506. According to particular embodiments, content 504 can include the object(s), person(s), or scene(s) of interest while the context 506 represents the remaining elements of the scene surrounding the content 504. In some examples, a surround view may represent the content 504 as three-dimensional data, and the context 506 as a two-dimensional panoramic background. In other examples, a surround view may represent both the content 504 and context 506 as two-dimensional panoramic scenes. In yet other examples, content 504 and context 506 may include three-dimensional components or aspects. In particular embodiments, the way that the surround view depicts content 504 and context 506 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 504 and the context 506 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

FIGS. 6A-6B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 6A, shown is one example of a concave view 600 in which a user is standing along a vertical axis 608. In this example, the user is holding a camera, such that camera location 602 does not leave axis 608 during image capture. However, as the user pivots about axis 608, the camera captures a panoramic view of the scene around the user, forming a concave view. In this embodiment, the object of interest 604 and the distant scenery 606 are all viewed similarly because of the way in which the images are captured. In this example, all objects in the concave view appear at infinity, so the content is equal to the context according to this view.

With reference to FIG. 6B, shown is one example of a convex view 620 in which a user changes position when capturing images of an object of interest 624. In this example, the user moves around the object of interest 624, taking pictures from different sides of the object of interest from camera locations 628, 630, and 632. Each of the images obtained includes a view of the object of interest, and a background of the distant scenery 626. In the present example, the object of interest 624 represents the content, and the distant scenery 626 represents the context in this convex view.

FIGS. 7A-7E illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view. As described with reference to FIGS. 7A-7E, the type of surround view (for example, concave or convex) is described with reference to the direction of the camera view.

Figure 7A:
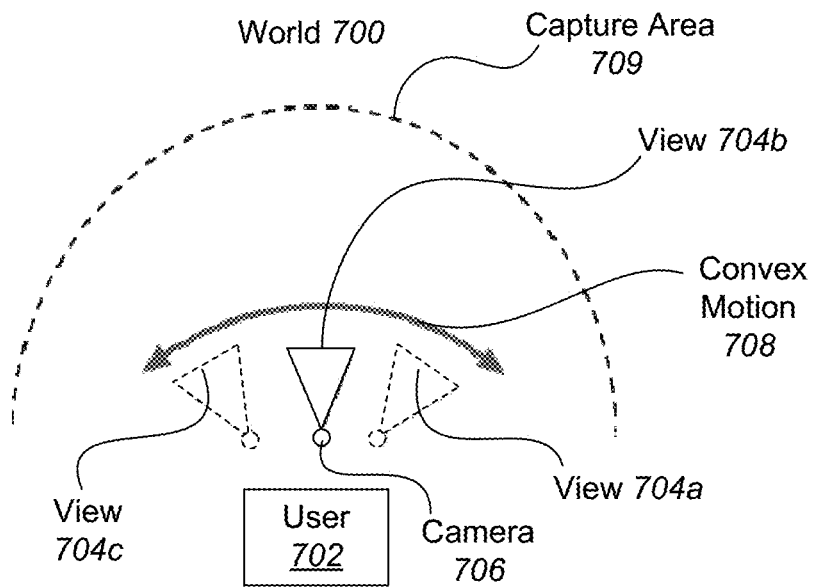
FIGS. 7A-7E illustrate examples of various capture modes for surround views, in accordance with one or more embodiments.

With reference to FIG. 7A, shown is an example of a back-facing, convex surround view being captured. According to various embodiments, a locally convex surround view is one in which the viewing angles of the camera or other capture device diverge. In one dimension this can be likened to the motion required to capture a spherical 370 panorama (pure rotation), although the motion can be generalized to any curved sweeping motion in which the view faces outward. In the present example, the experience is that of a stationary viewer looking out at a (possibly dynamic) context.

In the present example embodiment, a user 702 is using a back-facing camera 706 to capture images towards world 700, and away from user 702. As described in various examples, a back-facing camera refers to a device with a camera that faces away from the user, such as the camera on the back of a smart phone. The camera is moved in a concave motion 708, such that views 704a, 704b, and 704c capture various parts of capture area 709.

Figure 7B:
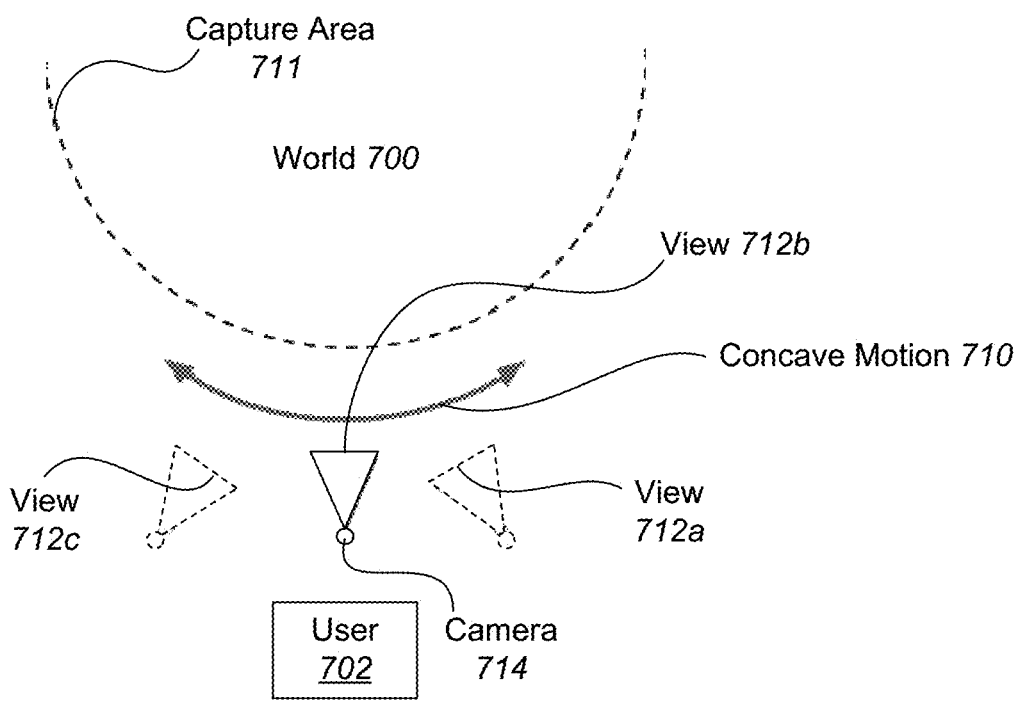

With reference to FIG. 7B, shown is an example of a back-facing, concave surround view being captured. According to various embodiments, a locally concave surround view is one in which viewing angles converge toward a single object of interest. In some examples, a locally concave surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 702 is using a back-facing camera 714 to capture images towards world 700, and away from user 702. The camera is moved in a concave motion 710, such that views 712a, 712b, and 712c capture various parts of capture area 711. As described above, world 700 can include an object of interest in some examples, and the convex motion 710 can orbit around this object. Views 712a, 712b, and 712c can include views of different sides of this object in these examples.

Figure 7C:
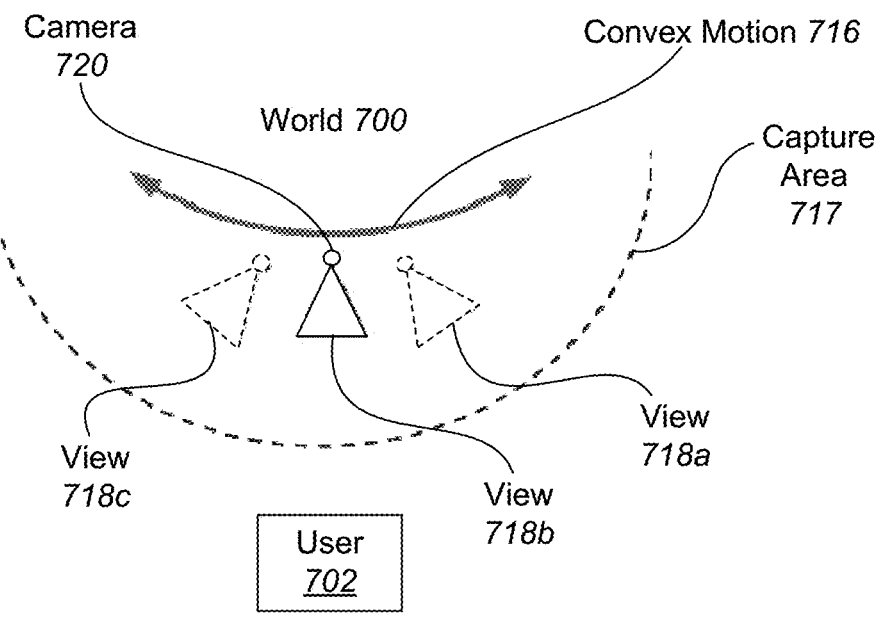

With reference to FIG. 7C, shown is an example of a front-facing, convex surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 720 is facing user 702. The camera follows a convex motion 706 such that the views 718a, 718b, and 718c diverge from each other in an angular sense. The capture area 717 follows a convex shape that includes the user at a perimeter.

Figure 7D:
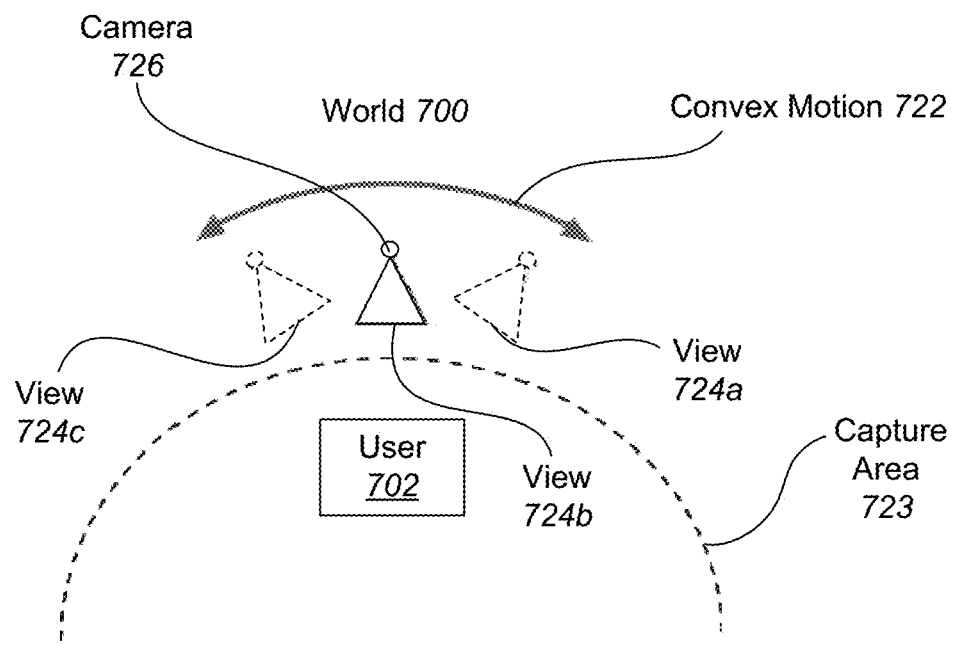

With reference to FIG. 7D, shown is an example of a front-facing, concave surround view being captured. In the present example embodiment, camera 726 is facing user 702. The camera follows a concave motion 722 such that the views 724a, 724b, and 724c converge towards the user 702. The capture area 717 follows a concave shape that surrounds the user 702.

Figure 7E:
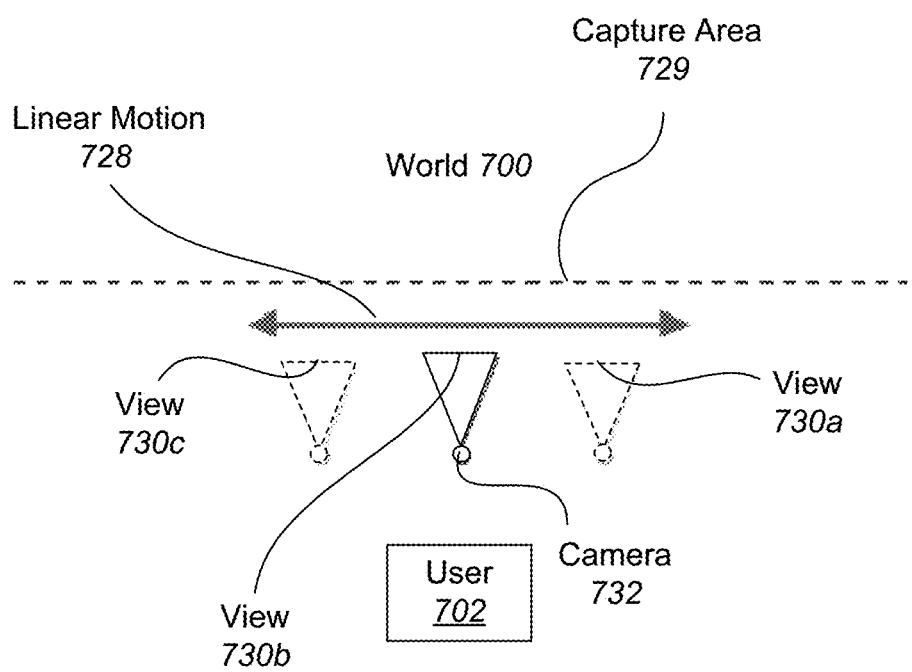

With reference to FIG. 7E, shown is an example of a back-facing, flat view being captured. In particular example embodiments, a locally flat surround view is one in which the rotation of the camera is small compared to its translation. In a locally flat surround view, the viewing angles remain roughly parallel, and the parallax effect dominates. In this type of surround view, there can also be an "object of interest", but its position does not remain fixed in the different views. Previous technologies also fail to recognize this type of viewing angle in the media-sharing landscape.

In the present example embodiment, camera 732 is facing away from user 702, and towards world 700. The camera follows a generally linear motion 728 such that the capture area 729 generally follows a line. The views 730a, 730b, and 730c have generally parallel lines of sight. An object viewed in multiple views can appear to have different or shifted background scenery in each view. In addition, a slightly different side of the object may be visible in different views. Using the parallax effect, information about the position and characteristics of the object can be generated in a surround view that provides more information than any one static image.

As described above, various modes can be used to capture images for a surround view. These modes, including locally concave, locally convex, and locally linear motions, can be used during capture of separate images or during continuous recording of a scene. Such recording can capture a series of images during a single session.

According to various embodiments of the present disclosure, a surround view can be generated from data acquired in numerous ways. For example, data may be acquired by moving a camera through space as described with reference to FIG. 7 of U.S. patent application Ser. No. 14/530,669. In particular, a user may tap a record button on a capture device to begin recording. As movement of the capture device follows a generally leftward direction, an object may move in a generally rightward motion across the screen. As the capture device moves leftward, the object appears to move rightward between subsequent views. In some examples, when the user is finished recording, the record button can be tapped again to end recording. In other examples, the user can tap and hold the record button during recording, and release to stop recording. In the present embodiment, the recording captures a series of images that can be used to generate a surround view.

Figure 8:
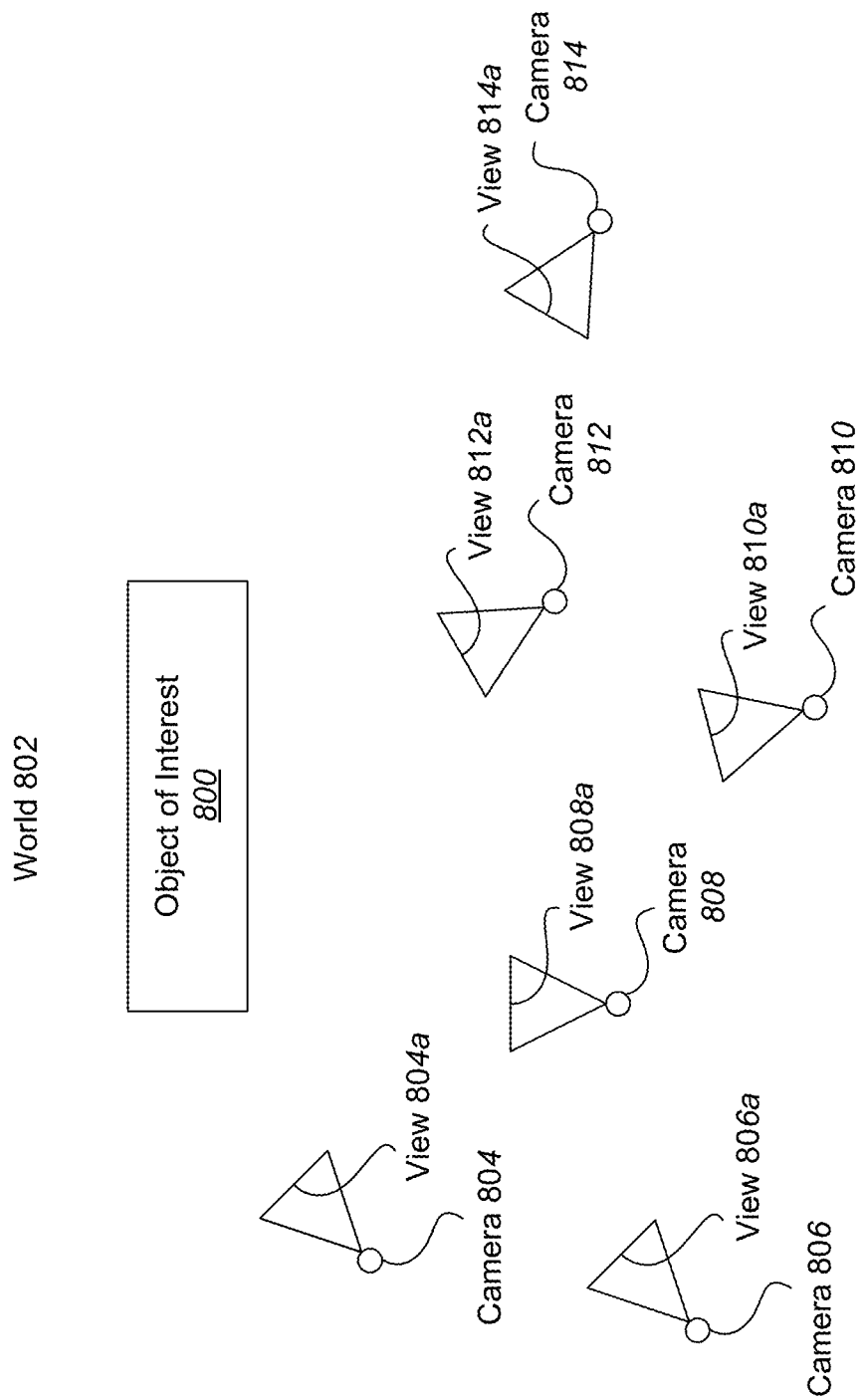
FIG. 8 illustrates one example of a space-time surround view being simultaneously recorded by independent observers, in accordance with one or more embodiments.

According to various embodiments, a series of images used to generate a surround view can be captured by a user recording a scene, object of interest, etc. Additionally, in some examples, multiple users can contribute to acquiring a series of images used to generate a surround view. With reference to FIG. 8, shown is one example of a space-time surround view being simultaneously recorded by independent observers.

In the present example embodiment, cameras 804, 806, 808, 810, 812, and 814 are positioned at different locations. In some examples, these cameras 804, 806, 808, 810, 812, and 814 can be associated with independent observers. For instance, the independent observers could be audience members at a concert, show, event, etc. In other examples, cameras 804, 806, 808, 810, 812, and 814 could be placed on tripods, stands, etc. In the present embodiment, the cameras 804, 806, 808, 810, 812, and 814 are used to capture views 804a, 806a, 808a, 810a, 812a, and 814a, respectively, of an object of interest 800, with world 802 providing the background scenery. The images captured by cameras 804, 806, 808, 810, 812, and 814 can be aggregated and used together in a single surround view in some examples. Each of the cameras 804, 806, 808, 810, 812, and 814 provides a different vantage point relative to the object of interest 800, so aggregating the images from these different locations provides information about different viewing angles of the object of interest 800. In addition, cameras 804, 806, 808, 810, 812, and 814 can provide a series of images from their respective locations over a span of time, such that the surround view generated from these series of images can include temporal information and can also indicate movement over time.

As described above with regard to various embodiments, surround views can be associated with a variety of capture modes. In addition, a surround view can include different capture modes or different capture motions in the same surround view. Accordingly, surround views can be separated into smaller parts in some examples, such as described with reference to FIG. 10 of U.S. patent application Ser. No. 14/530,669. For example, a complex surround-view may be separated into smaller, linear parts. In some embodiments, a complex surround view may include a capture area that follows a sweeping L motion, which includes two separate linear motions of the camera. The surround views associated with these separate linear motions can be broken down into two separate surround views. It should be noted that although the linear motions of the complex surround view can be captured sequentially and continuously in some embodiments, such linear motions can also be captured in separate sessions in other embodiments.

In some embodiments, the two linear surround views can be processed independently, and joined with a transition to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear surround views can also be separated into discrete components. In some examples, surround views can be broken down based on local capture motion. For example, a complex motion may be broken down into a locally convex portion and a linear portion. In another example, a complex motion can be broken down into separate locally convex portions. It should be recognized that any number of motions can be included in a complex surround view, and that such complex surround view can be broken down into any number of separate portions, depending on the application.

Figure 9:
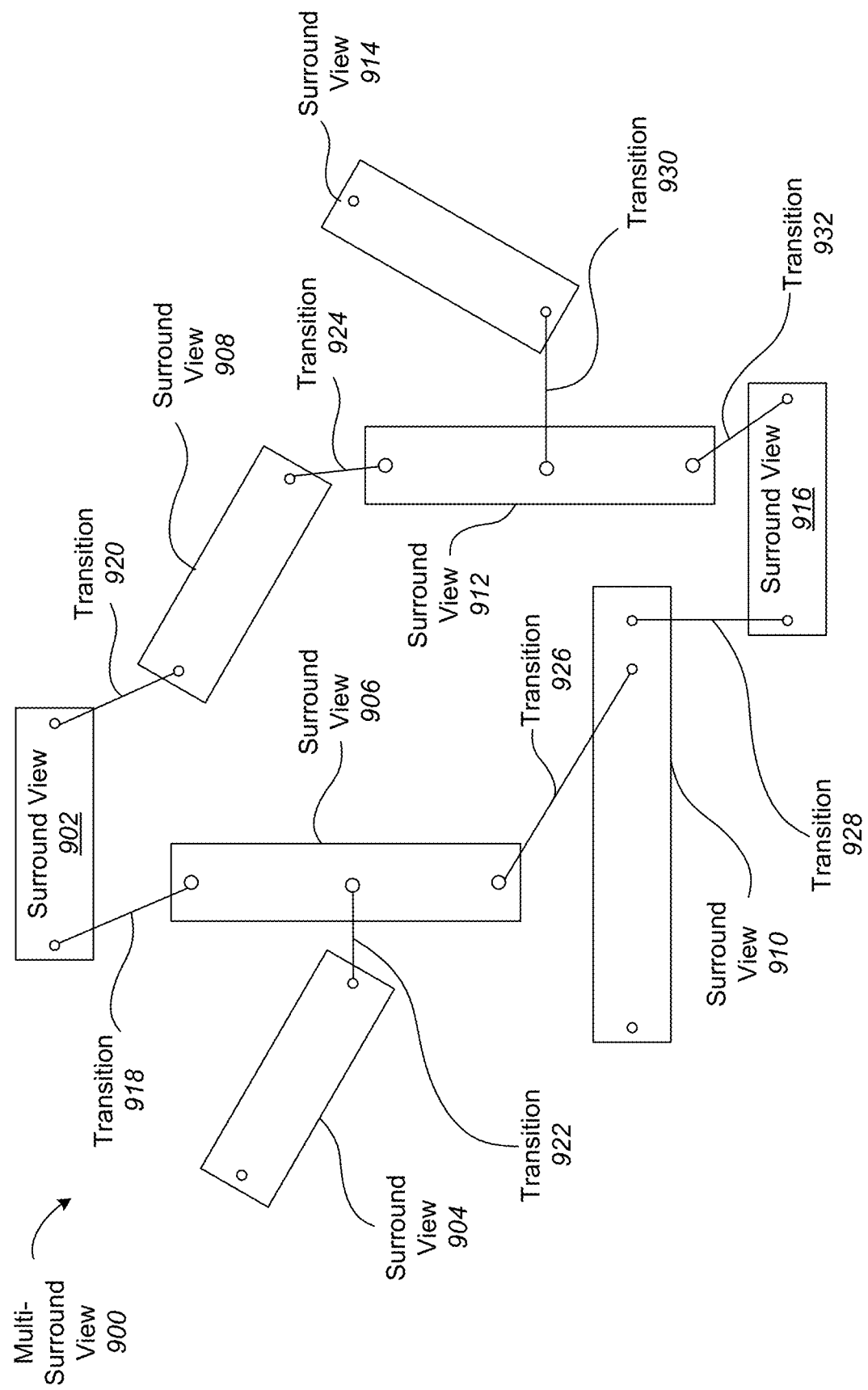
FIG. 9 illustrates one example of a combination of multiple surround views into a multi-surround view, in accordance with one or more embodiments.

Although in some applications, it is desirable to separate complex surround views, in other applications it is desirable to combine multiple surround views. With reference to FIG. 9, shown is one example of a graph that includes multiple surround views combined into a multi-surround view 900. In this example, the rectangles represent various surround views 902, 904, 906, 908, 910, 912, 914, and 916, and the length of each rectangle indicates the dominant motion of each surround view. Lines between the surround views indicate possible transitions 918, 920, 922, 924, 926, 928, 930, and 932 between them.

In some examples, a surround view can provide a way to partition a scene both spatially and temporally in a very efficient manner. For very large scale scenes, multi-surround view 900 data can be used. In particular, a multi-surround view 900 can include a collection of surround views that are connected together in a spatial graph. The individual surround views can be collected by a single source, such as a single user, or by multiple sources, such as multiple users. In addition, the individual surround views can be captured in sequence, in parallel, or totally uncorrelated at different times. However, in order to connect the individual surround views, there must be some overlap of content, context, or location, or of a combination of these features. Accordingly, any two surround views would need to have some overlap in content, context, and/or location to provide a portion of a multi-surround view 900. Individual surround views can be linked to one another through this overlap and stitched together to form a multi-surround view 900. According to various examples, any combination of capture devices with either front, back, or front and back cameras can be used.

In some embodiments, multi-surround views 900 can be generalized to more fully capture entire environments. Much like "photo tours" collect photographs into a graph of discrete, spatially-neighboring components, multiple surround views can be combined into an entire scene graph. In some examples, this can be achieved using information obtained from but not limited to: image matching/tracking, depth matching/tracking, IMU, user input, and/or GPS. Within such a graph or multi-surround view, a user can switch between different surround views either at the end points of the recorded motion or wherever there is an overlap with other surround views in the graph. One advantage of multi-surround views over "photo tours" is that a user can navigate the surround views as desired and much more visual information can be stored in surround views. In contrast, traditional "photo tours" typically have limited views that can be shown to the viewer either automatically or by allowing the user to pan through a panorama with a computer mouse or keystrokes.

According to various embodiments, a surround view is generated from a set of images. These images can be captured by a user intending to produce a surround view or retrieved from storage, depending on the application. Because a surround view is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a surround view provides views from many sides of an object, distinctive views that are appropriate for search can be selected from the surround view or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a surround view is determined to need additional views to produce a more accurate model, a user may be prompted to provide additional images.

Once a surround view is generated, it can be used in various applications, in particular embodiments. One application for a surround view includes allowing a user to navigate a surround view or otherwise interact with it. According to various embodiments, a surround view is designed to simulate the feeling of being physically present in a scene as the user interacts with the surround view. This experience depends not only on the viewing angle of the camera, but on the type of surround view that is being viewed. Although a surround view does not need to have a specific fixed geometry overall, different types of geometries can be represented over a local segment of a surround view such as a concave, convex, and flat surround view, in particular embodiments.

In particular example embodiments, the mode of navigation is informed by the type of geometry represented in a surround view. For instance, with concave surround views, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex surround views, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-surround view or a graph of surround views in which individual surround views can be loaded piece by piece and further surround views may be loaded when necessary (e.g. when they are adjacent to/overlap the current surround view and/or the user navigates towards them). If the user reaches a point in a surround view where two or more surround views overlap, the user can select which of those overlapping surround views to follow. In some instances, the selection of which surround view to follow can be based on the direction the user swipes or moves the device.

Figure 10:
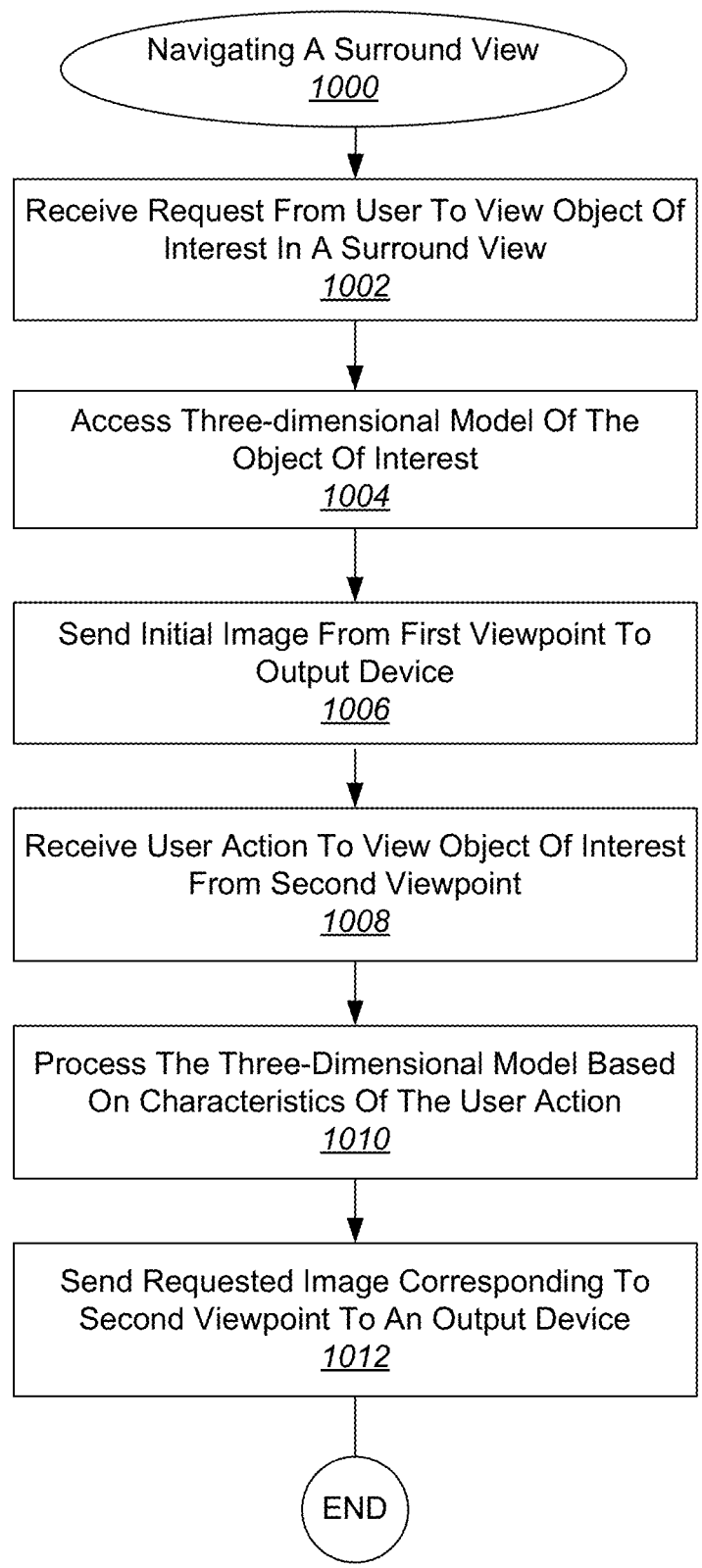
FIG. 10 illustrates one example of a process for navigating a surround view, in accordance with one or more embodiments.

With reference to FIG. 10, shown is one example of a process for navigating a surround view 1000. In the present example, a request is received from a user to view an object of interest in a surround view at 1002. According to various embodiments, the request can also be a generic request to view a surround view without a particular object of interest, such as when viewing a landscape or panoramic view. Next, a three-dimensional model of the object is accessed at 1004. This three-dimensional model can include all or a portion of a stored surround view. For instance, the three-dimensional model can be a segmented content view in some applications. An initial image is then sent from a first viewpoint to an output device at 1006. This first viewpoint serves as a starting point for viewing the surround view on the output device.

In the present embodiment, a user action is then received to view the object of interest from a second viewpoint at 1008. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model is processed at 1010. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.). An image from this viewpoint can be sent to the output device at 1012. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the surround view to provide the requested images.

In some embodiments, intermediate images can be sent between the initial image at 1006 and the requested image at 1012. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Segmentation of the Object of Interest and Background

According to various aspects of the present disclosure, AR/VR content is further generated by extracting an object of interest or other content, such as a person, within a sequence of images to separate it from the background and other context imagery. This may be achieved by applying various segmentation algorithms and processes to the images, as previously described with reference to FIG. 2. In some embodiments, semantic segmentation using neural networks is performed. In further embodiments, fine-grained segmentation is further performed. In some embodiments fine-grained segmentation may utilize conditional random fields and/or temporal conditional random fields.

Figure 11:
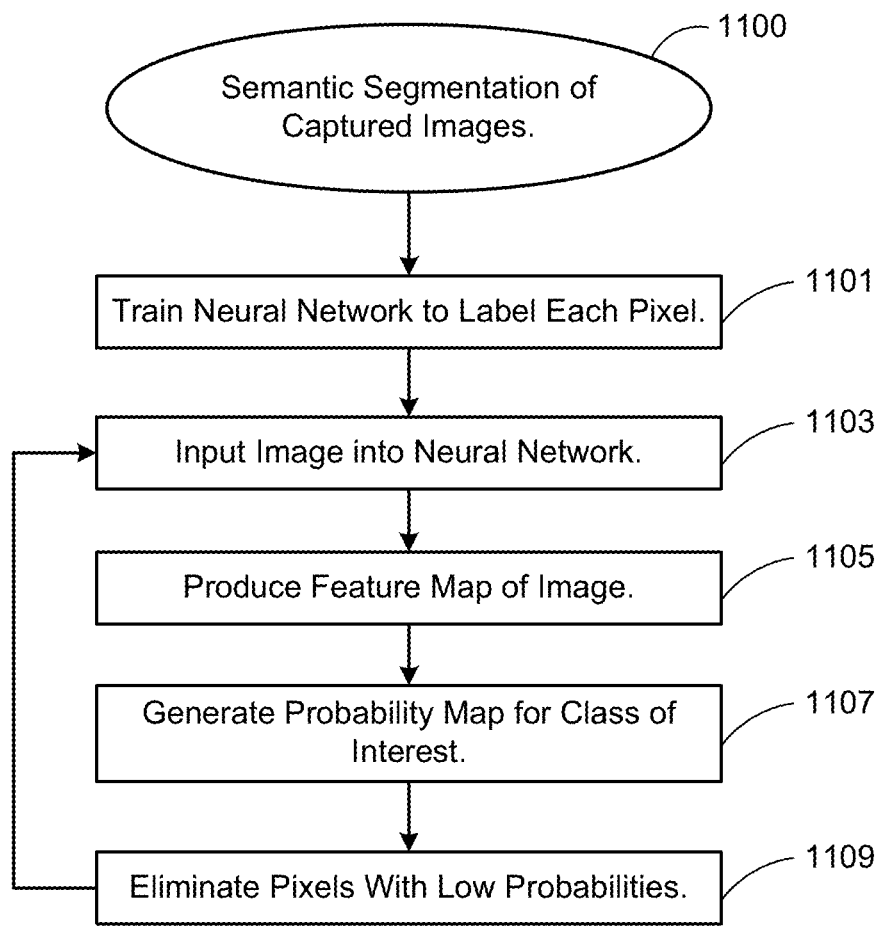
FIG. 11 illustrates an example method 1100 for semantic segmentation of image frames, in accordance with one or more embodiments, in accordance with one or more embodiments.

With reference to FIG. 11, shown is an example method 1100 for semantic segmentation of image frames, in accordance with one or more embodiments. In various embodiments, semantic segmentation is performed by a neural network system that has been trained to identify and label pixels according to a corresponding category or class. In some embodiments, the neural network system described herein is a convolutional neural network. In some embodiments, the neural network may comprise multiple computational layers.

At step 1101, a neural network is trained to label each pixel in an image. The neural network may be trained to label every pixel in the image with a particular category label (e.g., person, car, sky, etc.). Such training may be done by inputting training pairs comprising a training image and a corresponding label map. The training image may be input into the neural network as a tensor, such as third-order tensor, to be processed through the various layers of neural network for labeling. In some embodiments, the neural network is trained with a softmax loss on pixels after aggregating outputs from layers pool3, pool4 and conv7 in a feature map that results in a 8× downsample from the original image size. The result may then be compared to the predetermined label map corresponding to that training image. The parameters of the neural network may then be updated. In some embodiments, the parameters are updated using a stochastic gradient descent.

Once the neural network is sufficiently trained, it may be used to label pixels in new image sequences. Such image sequences may be images frames corresponding to a surround view, such as that generated at surround view 118. In other embodiments, the images may be unprocessed images captured by a camera. At step 1103, an image is input into the neural network.

A feature map of the image is then produced by the neural network at step 1105. In some embodiments, the neural network may be trained for k object classes (e.g., person, car, sky, etc.) to produce a feature map that has k channels where channel T represents the probability of each pixel being of object class T. In various embodiments, object classes may include, but are not limited to, the following object classes: building, grass, tree, cow, sheep, sky, airplane, water, face, car, bicycle, flower, sign, bird, book, chair, road, cat, dog, body, and boat. As previously described with reference to the training of the neural network, the neural network may aggregate outputs from layers pool3, pool4 and conv7 in a feature map that results in a 8× downsample from the original image size. The benefit of aggregating feature maps from different layers of the neural network allows the use of both finer scale and coarser scale details to produce these probability maps. For example, using only lower layers or only higher layers would produce sub-optimal outputs.

A probability map for a class of interest may be generated at step 1107. In some embodiments, to get a probability map of an object class of interest (e.g. person), the feature map corresponding to the person object class is extracted. Then pixels with low probabilities are eliminated at step 1109. For example, the pixels where the person object class is not the most probable amongst all other classes are zeroed out. In some embodiments, a threshold probability may be predetermined or set by a user. In some embodiments, the pixels with low probabilities are not eliminated, but labeled instead. The pixels corresponding to the desired object class may also be labeled. In some embodiments, the probability values may then be re-normalized between 0-1.

Method 1100 may then return to step 1101 to segment another image in the sequence of images. This procedure may be applied to every frame individually to obtain probability maps corresponding to the person object class for every frame. In some embodiments, the probability maps may then be passed onto the temporal dense conditional random field (CRF) smoothing system, further described below with reference to FIG. 12, to obtain a binary mask for every frame that is sharply aligned to the boundaries and temporally consistent (non-fluctuating). These binary masks are then used to mask out pixels in every frame to extract the person or other object of interest out of the frames.

A segmenting neural network capable of performing method 1100 may include various computational layers. In some embodiments, the neural network may include a series of convolution layers followed by pooling layers. A convolution-pool layer pair may be used to refer to a convolution layer followed by a pooling layer. Each convolution layer may accumulate and aggregate information from a larger area of the image to form a high level representation of the image. In other words, the convolution layers condense pixel information into a more abstract version in order to make it easier and faster to process by the segmenting neural network. Thus, the output for each convolution-pool layer pair may be down-sampled by 2×. In other embodiments, the convolution-pool layer pair may down-sample the input by more or less than 2×. In some embodiments, the pooling layers may be programmed to perform max pooling. Thus, the pooling layers may take the output of a convolution layer, identify the pixel with the highest value within 2×2 pixel neighborhoods, and set that pixel as the pixel in the down-sampled output of the convolution-pool layer pair. In some embodiments, the values of the pixels are based on the RGB value after being processed by the convolution layer within a convolution-pool layer pair.

For example, an image comprising a pixel dimension of 512×512 pixels may be input into a first convolution-pool layer Pair 1, which may output a 2× down-sampled Output 1 comprising a pixel dimension of 256×256 pixels, where each pixel in Output 1 represents the highest valued pixel of a 2×2 pixel neighborhood in the original image. Output 1 may then be input into a second convolution-pool layer Pair 2, which may output a 4× down-sampled Output 2 comprising a pixel dimension of 128×128 pixels, where each pixel in Output 2 represents the highest valued pixel of a 2×2 pixel neighborhood in Output 1. Output 2 may then be input into a third convolution-pool layer Pair 3, which may output a 8× down-sampled Output 3 comprising a pixel dimension of 64×64 pixels, where each pixel in Output 3 represents the highest valued pixel of a 2×2 pixel neighborhood in Output 2. Output 3 may then be input into a fourth convolution-pool layer Pair 4, which may output a 16× down-sampled Output 4 comprising a pixel dimension of 32×32 pixels, where each pixel in Output 4 represents the highest valued pixel of a 2×2 pixel neighborhood in Output 3. Output 4 may then be input into a fifth convolution-pool layer Pair 5, which may output a 32× down-sampled Output 5 comprising a pixel dimension of 16×16 pixels, where each pixel in Output 5 represents the highest valued pixel of a 2×2 pixel neighborhood in Output 4. In some embodiments, output 5 may then be processed through one or more additional convolution layers.

After five convolution-pool layer pairs, Output 5 may include accurately labeled pixels. However, Output 5 has also been down-sampled by 32×. Thus, if resized back to 512×512 pixel dimension, Output 5 may yield a very coarse image with low resolution, which may not define fine structures within the original image input. Thus, in some embodiments, outputs from intermediate convolution-pool layer pairs, which include higher resolutions, may be added together to refine the output of the segmenting neural network. For example, Output 3, Output 4, and Output 5 may be combined. Outputs 4 and 5 may be resized and up-sampled to 8×. Since Output 3 is already 8×, it would not need to be up-sampled before adding. In some embodiments, more or less outputs from any other convolution-pool layer pairs may be used. In some embodiments, the Outputs 3, 4, and 5 are combined providing an 8× down-sampled Output A that may include accurate labeling, as well as a higher resolution. In some embodiments, additional sequential processing through one or more additional convolution layers may be performed on Output A, and/or on Outputs 3, 4, and 5 before their combination.

In some embodiments, the Output A may then be up-sampled and resized back to the format of the original image input (which, in this example, is 512×512 pixels). In some embodiments, interpolation may be performed to resize the Output A back to the original format. In some embodiments, pixel labeling via method 1100 occurs during one or more of the convolution-pool layer pairs. In other embodiments, pixel labeling may occur during the convolution layers and/or the pooling layers. In various embodiments, more or fewer convolution-pool layer pairs may be programmed in the segmenting neural network. As previously described, during the training procedure of such segmenting neural network, the system may perform a backwards pass to adjust the parameters of the described layers based on the training image and corresponding label map. In some embodiments, the parameters are updated using a stochastic gradient descent.

Figure 12:
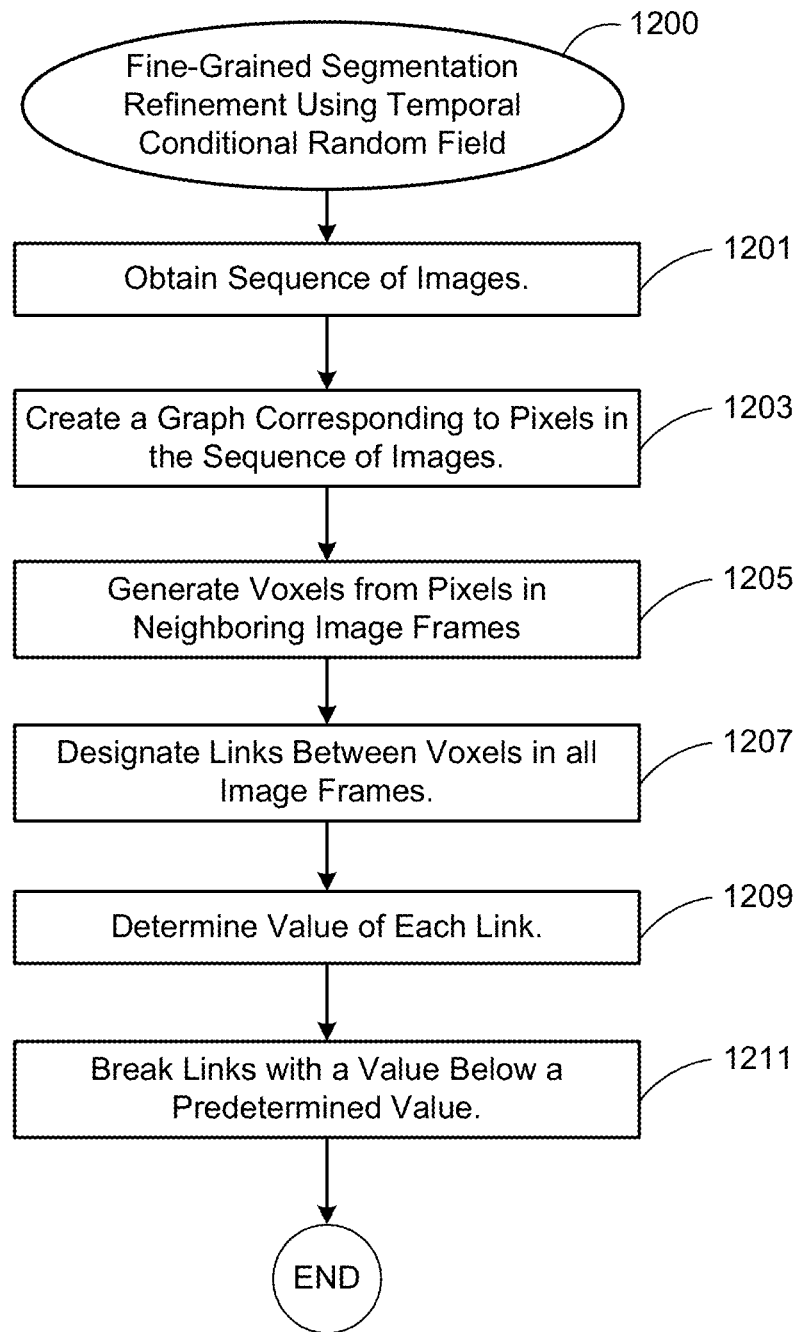
FIG. 12 illustrates an example method 1200 for fine-grained segmentation of image frames with temporal conditional random field, in accordance with one or more embodiments, in accordance with one or more embodiments.

With reference to FIG. 12, shown is an example method 1200 for fine-grained segmentation of image frames with temporal conditional random field, in accordance with one or more embodiments. At step 1201, a sequence of images is obtained. The sequence of images obtained at step 1201 may be the image output from method 1100. In some embodiments, the output from method 1100 may comprise extracted pixels corresponding to an object of interest. In other embodiments, the output from method 1100 may comprise an image frame with labeled pixels that correspond to an object of interest or background. In some embodiments, the images may be obtained at step 1201 one at a time as they are segmented in method 1100, rather than the entire sequence of images.

At step 1203, a graph corresponding to the pixels in an image is created. In some embodiments, the graph is a graphical model of the pixels in the image, each of which represents a node in the graph. In various embodiments, this graphical model may be a conditional random field. Links between each node may be created and include a link strength value defined by parameters such as x,y distance between the linked pixels, and/or color distance based RGB value difference of the linked pixels. In some embodiments, every node includes one or more designated edges, which may be used to determine the distance of that pixel to other pixels. In other embodiments, brightness may be used to determine the strength value of a link. The links with a strength value under a predetermined threshold value may be broken. In this way, the graphical model may be divided into two sub-graphs of nodes, one corresponding to the foreground and/or object of interest of the object class, the other corresponding to the background or context. In some embodiments, the graphical model may be divided into any number of sub-graphs corresponding to different object classes and/or background. In some embodiments, the sub-graphs may be labeled, but the links between pixels corresponding to different sub-graphs may not be actually broken.

In certain embodiments, the images may be segmented based on x,y distance and RGB value difference of the pixels, as described above. However, in other embodiments, a time parameter may also be used to determine the strength of a link between pixels. For example, a temporal random conditional field may be implemented for fine-grained segmentation. According to some embodiments, voxels are generated from the pixels in neighboring image frames at step 1205. Links may be established between pixels in neighboring image frames in the image sequence. For example, pixels in an image may be connected to pixels in the nearest five image frames that are continuous in time. In other embodiments, pixels in any number of chronologically neighboring images may be connected. In some embodiments, pixels in all image frames in the image sequence are connected. In some embodiments, the pixels are connected to corresponding pixels in the neighboring image frames. Corresponding pixels may be identified by various keypoint detectors and tracking methods described herein. As such, voxels are generated from the connected pixels between neighboring image frames. For example, a voxel may include a volume defined by designated edges of the pixel node in an image frame and its span across neighboring frames.

At step 1207, links are designated between voxels in all image frames. Each voxel may be linked to every other voxel. Then the value of each link is determined at step 1209. As previously described the strength value between each voxel link may be based on parameters including x,y distance, RGB value difference, and closeness in time. In some embodiments, the strength value of a link between voxels is a weighted sum of the three parameters. At step 1211, links with a value below a predetermined value are broken.

In some embodiments, performing method 1100 for semantic segmentation on the images first shortens the processing time and resources necessary to perform method 1200 for fine-grained segmentation. Overall, the segmentation process may be performed faster by a neural network system or other computer system. In some embodiments, the steps of method 1100 and processes described with reference to step 1203 of method 1200 may be performed on a single initial image frame. The extracted object of interest may then be used to create a temporal conditional random field corresponding to all other images in the image sequence. This may allow the remaining images after the single initial image frame to be segmented without being semantically segmented by method 1100. This may further speed the processing time required for segmentation of all images in the sequence.

View Interpolation and Artificial Frame Generation

As described above, view interpolation can be used to improve the viewing experience. In particular, to avoid sudden "jumps" between stabilized frames, synthetic, intermediate views can be rendered during acquisition or generation of a surround view. Additionally, synthetic, intermediate views may also be rendered to complete stereographic pairs of frames. According to various embodiments, only a limited amount of image frames are stored for each surround view for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view. In some embodiments, view interpolation may be performed on the entire images within the image frames of an image sequence. In other embodiments, view interpolation may be performed only on pixels extracted from method 1100 and/or method 1200.

Various embodiments of the present disclosure relate generally to systems and processes for artificially rendering images using interpolation of tracked control points. According to particular embodiments, a set of control points is tracked between a first frame and a second frame, where the first frame includes a first image captured from a first location and the second frame includes a second image captured from a second location. An artificially rendered image corresponding to a third location is then generated by interpolating individual control points for the third location using the set of control points and interpolating pixel locations using the individual control points. The individual control points are used to transform image data.

Figure 13:
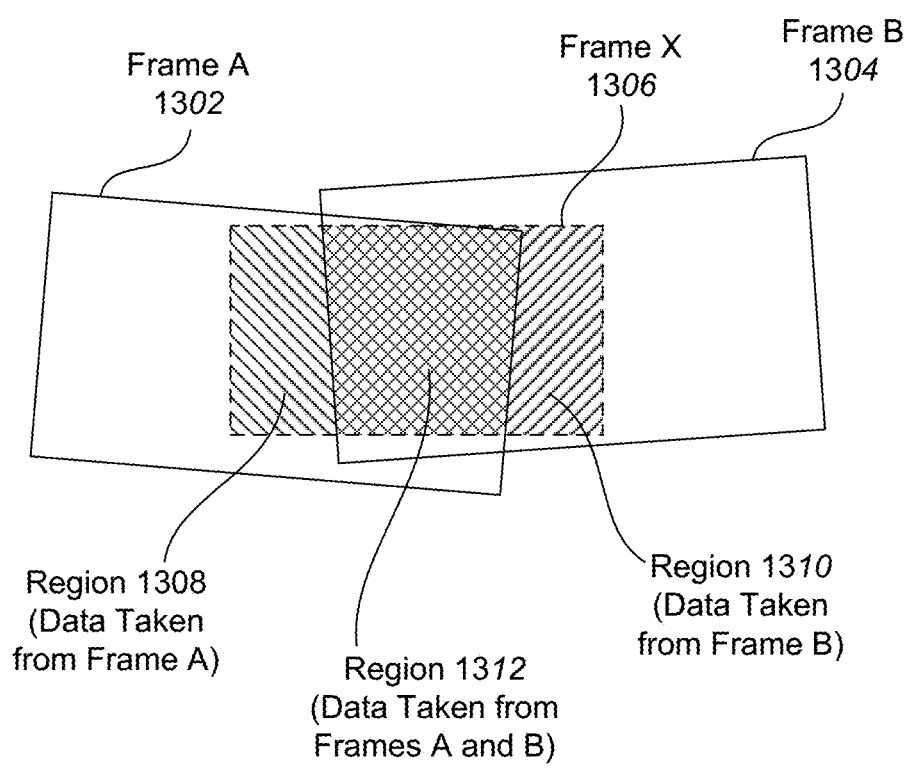
FIG. 13 illustrates an example of combining image information gathered from two frames to artificially render an image for another frame using weighted image information, in accordance with one or more embodiments.

In the present example, combining the image information gathered from both Frames A and B, as described in FIG. 4, can be done in various ways. The following FIGS. 13-21 provide various methods and/or examples of view interpolation as previously described with reference to various enhancement algorithms, such as at enhancement algorithms block 116 and/or at AR/VR content generation block 122. With reference to FIG. 13, shown is one example of a way to combine image information gathered from both Frames A and B to artificially render an image in Frame X using weighted image information. Such combination of image information may be performed by a view interpolation algorithm as previously described with reference to FIG. 1. As shown, image information is taken from Frame A 1302 and Frame B 1304 to generate an image in Frame X 1306. Image information in Region 1308 of Frame X 1306 is taken from Frame A 1302. Image information in Region 1310 of Frame X 1306 is taken from Frame B 1304. Image information in Region 1312 of Frame X 1306 includes information from both Frame A 1302 and Frame B 1304. In order to account for the overlap in information, the image information is weighted. Specifically, the information is combined using the image information from Frame A 1302 using 1-x and the image information from Frame B 1304 using x.

Figure 14:
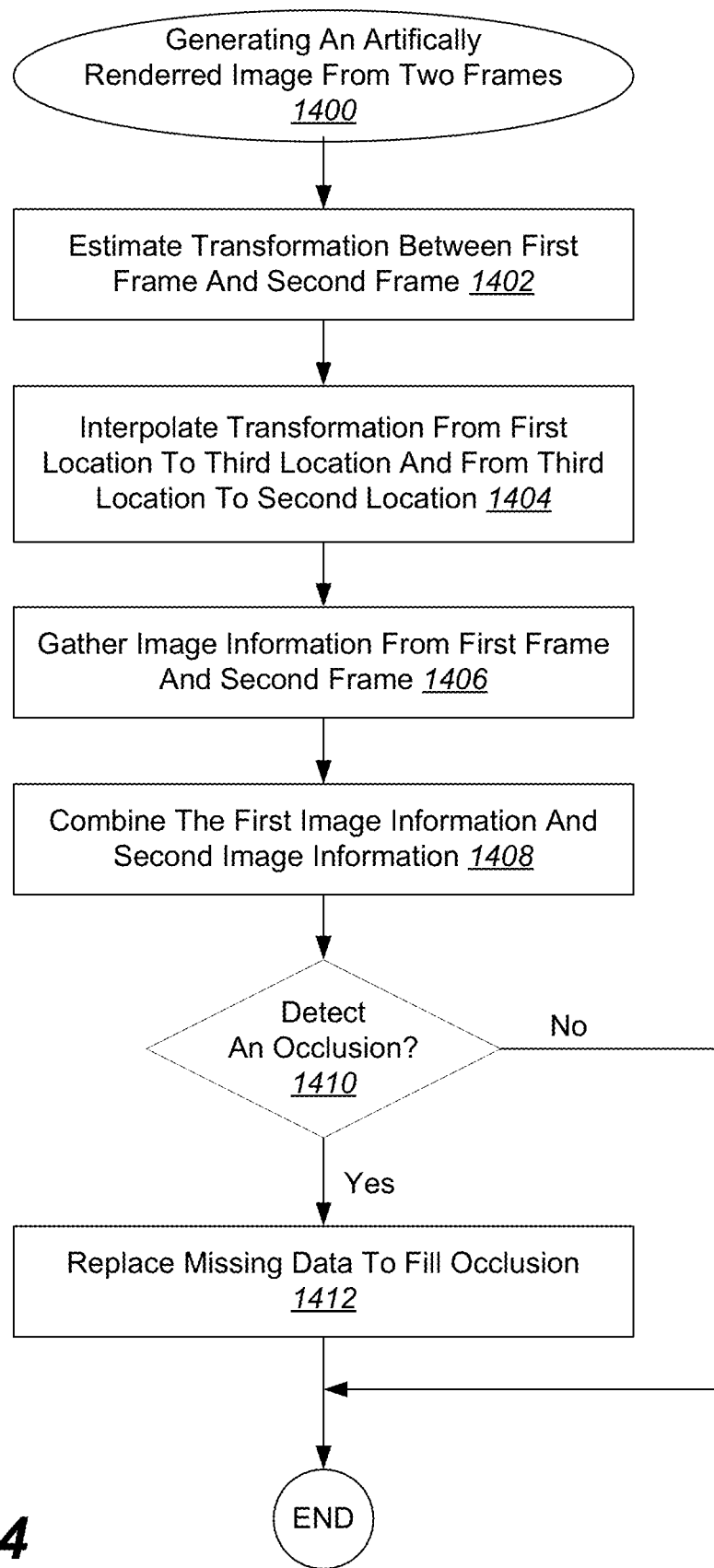
FIG. 14 illustrates an example of a process for generating an artificially rendered image from two frames, in accordance with one or more embodiments.

With reference to FIG. 14, shown is an example of a process 1400 for generating an artificially rendered image from two frames. In this example, a transformation is estimated between a first frame and a second frame at 1402. The transformation is estimated using methods such as homography, affine, similarity, translation, rotation, or scale. As described above with regard to FIG. 4, the first frame includes a first image captured from a first location (Location A 422) and the second frame includes a second image captured from a second location (Location B 424). In some examples, the first image and second image are associated with the same layer. Next, an artificially rendered image is rendered corresponding to a third location. This third location is positioned on a trajectory between the first location and the second location, as shown as Location X 426 in FIG. 4.

The artificially rendered image is generated in a number of steps. First, a transformation is interpolated from the first location to the third location and from the third location to the second location at 1404. In some instances, interpolating the transformation includes parameterizing the transformation from the first location to the third location and from the third location to the second location. Furthermore, in some examples, the parameterized transformation is then linearly interpolated.

Next, image information is gathered from the first frame and the second frame at 1406 by transferring first image information from the first frame to the third frame based on the interpolated transformation and second image information from the second frame to the third frame based on the interpolated transformation. Finally, the first image information and the second image information are combined to yield the artificially rendered image. In some examples, combining the first image information and the second image information includes weighting the first image information from the first frame and weighting the second image information from the second frame.

According to various embodiments, the process can end with combining the first image information and second image information at 1408. However, according to the present example, the process shown continues with determining whether an occlusion is present in the artificially rendered image at 1410. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 15. These layers can move relative to each other. In some cases, the layers may move in a manner causing an occlusion in a combined image. If an occlusion is detected, then the missing data is replaced to fill the first occlusion at 1412. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

With reference to FIG. 15, shown is an example of combining image information gathered from both Frames A and B to artificially render an image in Frame X by using multiple layers of an image. The present example uses the method described above with regard to FIG. 14, where the first frame and second frame are made up of two or more layers. In particular, the first frame, which includes a view at Time A 1502, includes a background layer 1506 and foreground layer 1504. The second frame, which includes a view at Time B 1508, includes a background layer 1512 and foreground layer 1510. In some examples, foreground and/or background can include one or more layer. In the present example, a layer is a region of image pixels that share a similar motion, based on factors such as depth and or speed of the corresponding real world object.

In the present example, viewpoint-interpolation can be used to generate an artificially rendered image as described above with regard to FIG. 14. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is non-see-through, image information from the first layer is taken wherever the first and second layer overlap. In the case that the first layer is partially see-through, image information is taken from both layers according to the opacity of the first layer. This process can also be extended to more than two layers.

As described above with regard to FIG. 14, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 17. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 16A:
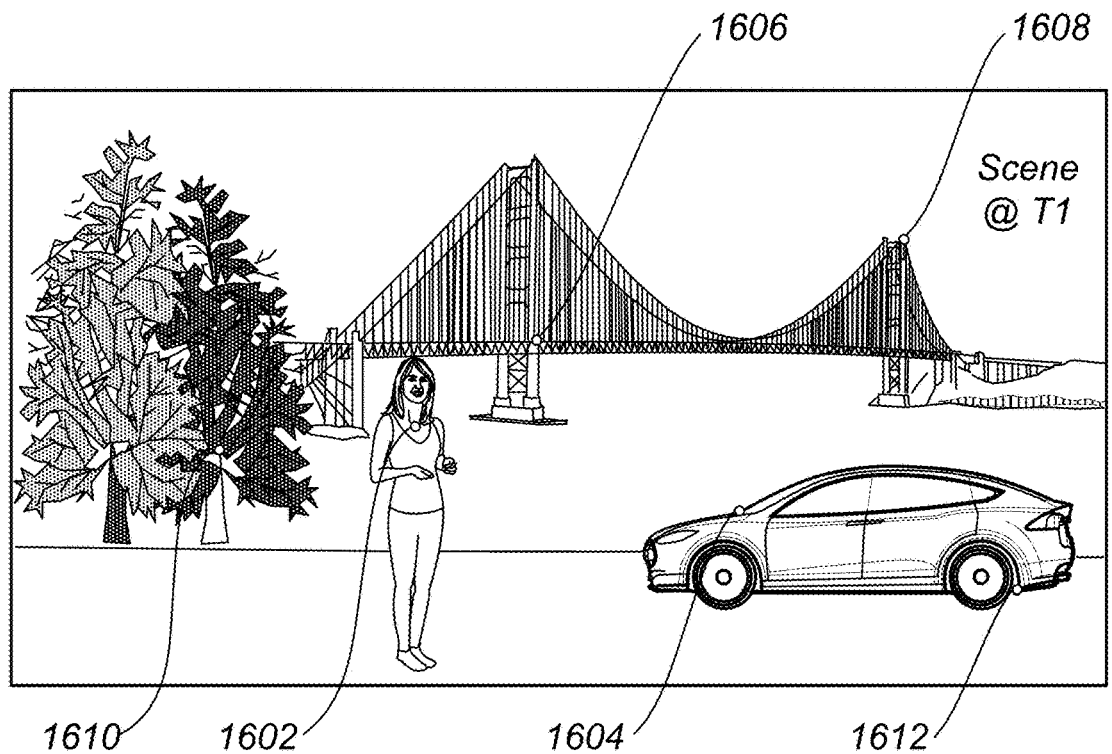
FIGS. 16A-16B illustrate an example of an image transformation between two frames using tracked control points between the two frames, in accordance with one or more embodiments.
Figure 16B:
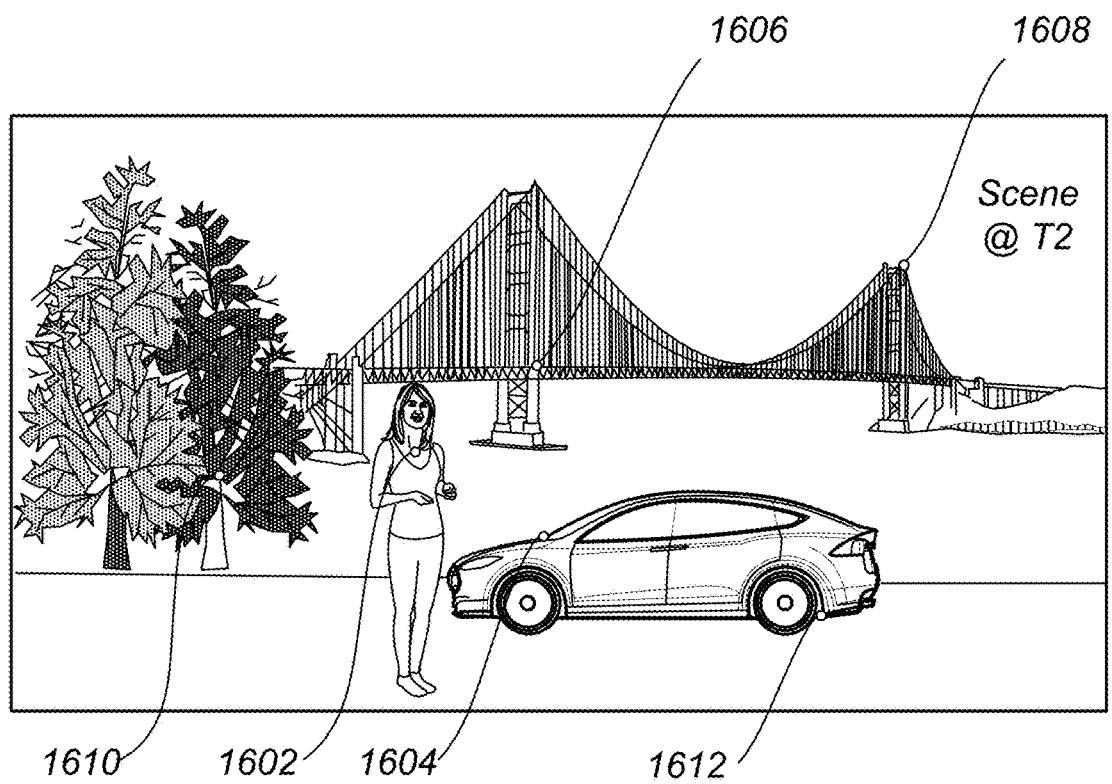

With reference to FIGS. 16A-16B, shown is an example of an image transformation between two frames using tracked control points between the two frames. In particular, FIG. 16A shows a first frame of a scene at a first time T1 and FIG. 16B shows a second frame of the scene at a second time T2. A set of control points 1602, 1604, 1606, 1608, 1610, and 1612 are tracked between the two frames, such that their locations are known in both frames. An intermediate frame X at x \in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other example, each pixel in the first frame corresponds to a control point in the set of control points. Accordingly, each pixel is tracked and interpolated in that instance.

In the present embodiment, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 17:
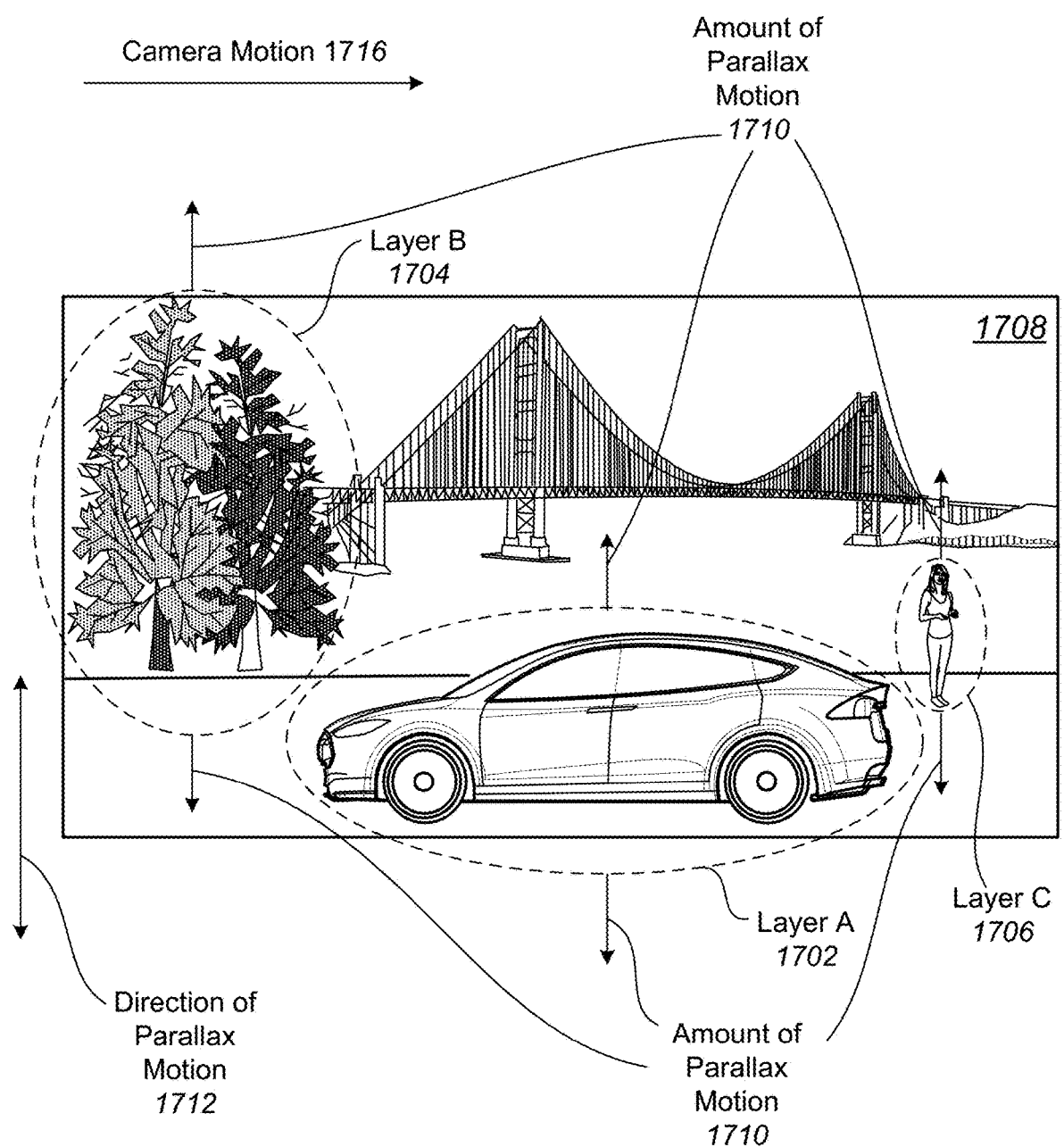
FIG. 17 illustrates an example of viewpoint extrapolation outside of the trajectory between two frames using multiple layers and the parallax effect, in accordance with one or more embodiments.

With reference to FIG. 17, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 1708 includes multiple layers, such as Layer A 1702, Layer B 1704, and Layer C 1706. Although not shown, two frames capturing images of the scene 1708 can be obtained by moving a camera along camera motion 1716. Comparing the two images will show parallax motion in the direction 1712. As shown in the figure, the amount of parallax motion 1710 of each of the layers can indicate movement or differences between the frames. Although not indicated in the figure, the different layers 1702, 1704, and 1706 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 18:
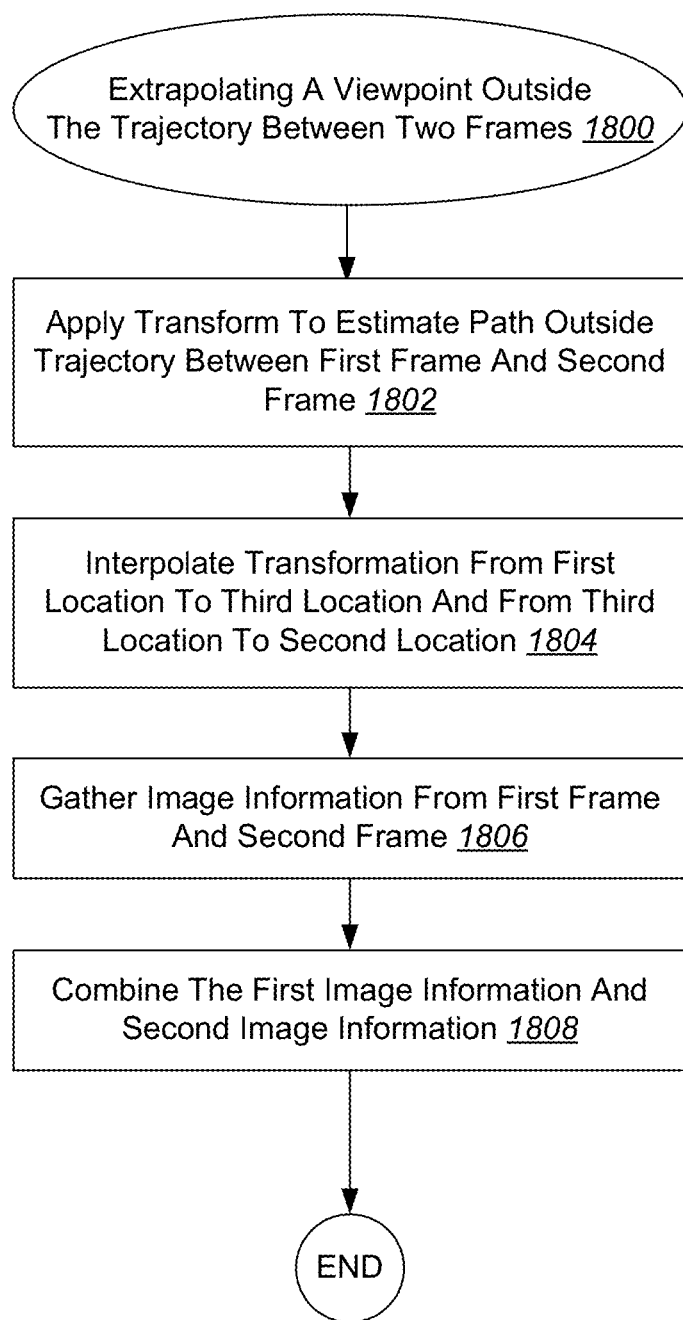
FIG. 18 illustrates an example of a process for extrapolating a viewpoint outside the trajectory between two frames, in accordance with one or more embodiments.

With reference to FIG. 18, shown is an example of a process 1800 for extrapolating a viewpoint outside the trajectory between two frames. This process can be viewed as an extension to the process described with regard to FIG. 14, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 1802. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 1804. Image information is then gathered from the first frame and the second frame at 1806 by transferring first image information from the first frame to the third frame based on the interpolated transformation and second image information from the second frame to the third frame based on the interpolated transformation. Finally, the first image information and the second image information is combined at 1808.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 17, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 19:
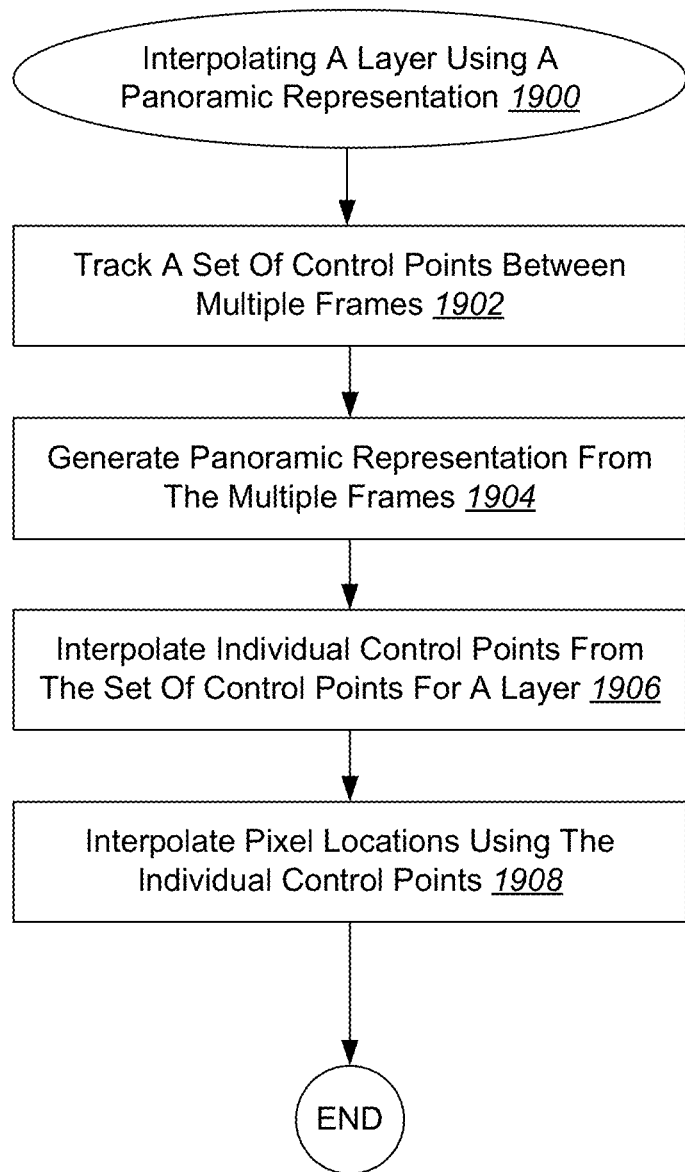
FIG. 19 illustrates an example of a process for interpolating a layer using a panoramic representation, in accordance with one or more embodiments.

With reference to FIG. 19, shown is an example of a process 1900 for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 1902. In some examples, each pixel corresponds to a control point in the set of control points. In these cases, each pixel is then interpolated based on the set of control points for the artificially rendered image. Next, a panoramic representation is generated from the multiple frames at 1904. Individual control points are then interpolated from the set of control points at 1906 for a desired frame or layer. Pixel locations are then interpolated for this frame or layer using the individual control points at 1908. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 20:
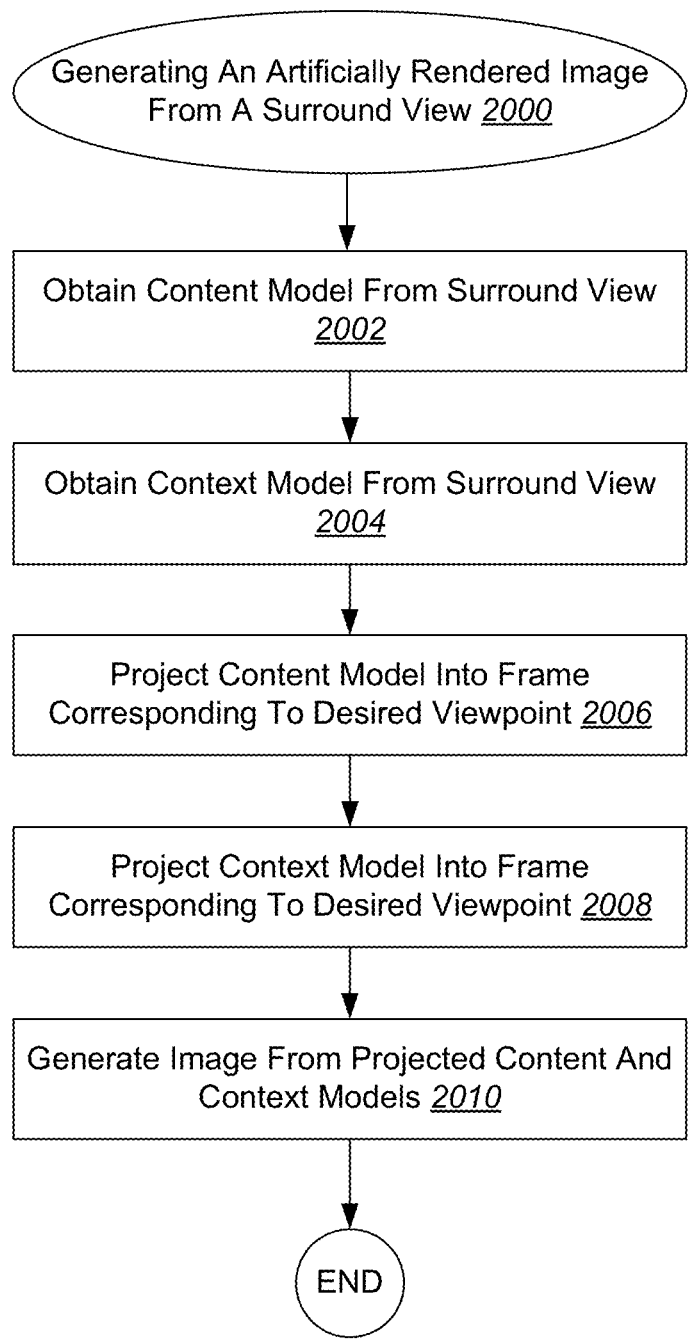
FIG. 20 illustrates an example of a process for generating an artificially rendered image from a surround view, in accordance with one or more embodiments.

With reference to FIG. 20, shown is an example of a process for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 2002. This content model is a foreground three-dimensional model including at least one object. In some examples, obtaining the content model from the surround view includes extracting the content model from the surround view. At 2004, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 2006. The context model is also projected into the frame corresponding to the desired viewpoint at 2008. According to various embodiments, the content model and context model are projected according to the depth and orientation of the content model. The artificially rendered image at the desired viewpoint is generated from a combination of the projected content and context at 2010.

Various examples of viewpoint interpolation and extrapolation are described in the present disclosure. According to various embodiments, one or a combination of methods can be used to generate a single artificially rendered image. For instance, one layer can be handled using the method described with regard to FIG. 14, another layer can be handled using the method described with regard to FIGS. 16A-16B, and a background layer can be handled using the method described with regard to FIG. 19. Any combination of methods can be used within the scope of this disclosure. Additionally, any one method can be used alone to generate an artificially rendered image.

Figure 21:
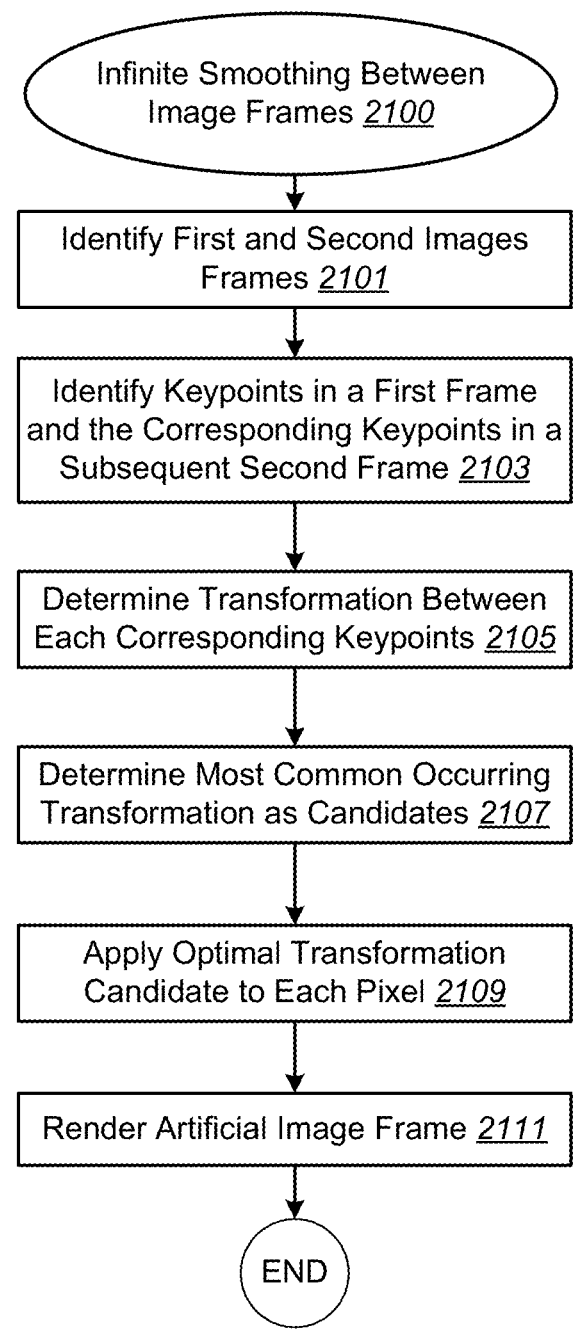
FIG. 21 illustrates an example of a method for infinite smoothing between image frames, in accordance with one or more embodiments.

With reference to FIG. 21, shown is an example of a method 2100 for infinite smoothing between image frames, in accordance with one or more embodiments. In various embodiments, method 2100 may be implemented as one or more various steps in method 1400, such as estimating transformation at step 1402 and/or interpolating the transformation at step 1404.

At step 2101, first and second image frames are identified. In some embodiments, the first and second image frames may be part of a sequence of images captured as described with reference to FIGS. 1-8. In various embodiments, the image frames may be consecutively captured images in time and/or space. In some embodiments, the first and second image frames may be adjacent image frames, such as frame N and frame N+1. The method 2100 described herein may be implemented to render any number of frames between N and N+1 based on the position of the user and/or viewing device.

A RANSAC (random sample consensus) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 2103, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2105, a transformation is determined for each corresponding keypoint in each image frame. In some embodiments, a set of two keypoint correspondences are used to determine a transformation, such as described in step 2405 with reference to FIG. 24. Various parameters may be used to calculate the transformation between corresponding keyframes by a predetermined algorithm. In one example embodiment, similarity 2D parameters, including x,y translation, a 2D rotation, and a 2D scale, may be used to determine the translation. Other parameters that may be used include 2D translation (x and y translation), 2D Euclidean paramters (2D rotation and x,y translation), affine, homography, etc. The RANSAC algorithm may repeatedly select corresponding keyframes between image frames to determine the transformation. In some embodiments, corresponding keyframes may be selected randomly. In other embodiments, corresponding keyframes may be selected by location.

Once all transformations have been calculated for each keyframe correspondence, the most common occurring transformations are determined as candidates at step 2107. According to various embodiments, keypoints may be grouped based on the associated transformation calculated at step 2105. In some embodiments, each transformation determined at step 2105 is applied to all keypoints in an image, and the number of inlier keypoints for which the transformation is successful is determined, such as described in step 2411 with reference to FIG. 24. In other words, keypoints that experience the same transformation between the first and second image frames are grouped together as inlier keypoints. In some embodiments, a predetermined number of transformations with the most associated inlier keypoints are selected to be transformation candidates. In some embodiments, the image intensity difference between a transformed image and the second image may also be calculated for each transformation determined at step 2105 and applied to the keypoints, such as described in steps 2415 and 2419 with reference to FIG. 24. In some embodiments, image intensity difference is only calculated if a transformation results in a larger number of inlier keypoints than a previous determined transformation as described in step 2413. In various embodiments, the transformations are ranked based on the corresponding number of resulting inlier keypoints and/or image intensity difference.

In various embodiments, a predetermined number of highest ranking transformations are selected to be transformation candidates. In some embodiments, the remaining transformations determined at step 2105 are discarded. Any number of transformation candidates may be selected. However, in some embodiments, the number of transformations selected as transformation candidates is a function of processing power. In some embodiments, processing time may increase linearly with increased number of candidates. In an example embodiment, eight possible transformation candidates with the most associated keypoints are selected. In some embodiments, steps 2103, 2105, and 2107 are run offline. In some embodiments, steps 2103, 2105, and 2107 are run in real-time, as image frames are captured.

At step 2109, the optimal transformation candidate is applied to each pixel. Each pixel in an image may experience a different transformation between frames. In some embodiments, each of the transformation candidates is applied to each pixel. The transformation candidate that results in the least difference between frames may be selected. In some embodiments, each of the transformation candidates is applied to a group, or "community," of pixels. For example, a community of pixels may comprise a 7×7 (−3, +3) group of pixels. Once an optimal transformation is applied to each pixel, an artificial image may be rendered at step 2111. In various embodiments, steps 2109 and 2111 may be performed during runtime when the user is viewing the sequence of images. In such embodiments, the transformation may be a function of frame number of the frame between N and N+1. The number of frames between N and N+1 may be determined based on various considerations, such as the speed of movement and/or the distance between frames N and N+1. Because method 2100 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based on the calculated transformation parameters, storage of such artificial image frames is not required. This enhances the functioning of image processing computer systems by reducing storage requirements.

Method 2100 may then be implemented for the transition between each image frame in the sequence. Various embodiments of method 2100 may provide advantages over existing methods of rendering artificial images, such as alpha blending. Especially in the case of concave surround views, existing methods result in artifacts or ghosting effect from improperly aligned image frames. This occurs because unlike convex surround views, concave and/or flat surround views do not experience a single transformation for all pixels and/or keypoints. Method 2100 provides a process for determining the optimal transformation out of multiple transformation candidates to apply to a pixel. Additionally, method 2100 may generate image frames that are seen, as well as portions of image frames that are unseen. Thus, motion between two discretized image frames may be generated by selecting the frame that includes the least amount of conflict.

Generation of Artificial Motion Blur

It is often desirable to show objects of an MIDMR as if it were in motion. For example, it may be desirable to show a car in an MIDMR where it appears that the car is in motion. However, capturing a car in motion and generating an MIDMR presents several challenges. One challenge is the difficulty of capturing a clear image of the car against a moving background unless the camera is also moving with the car, i.e., the camera is standing still relative to the car. In addition, a still camera with a high speed shutter would only capture the car against a still background. Yet another difficulty arises when trying to fuse together images of the car against a moving background. Thus, methods and systems are provided that generate high quality MIDMRs with "moving backgrounds" by applying a post processing blur effect. FIGS. 26A-26B depict a flowchart of an example method 2600 for generating a three-dimensional (3D) projection of an object with artificial motion blur. FIGS. 22-25 illustrate detailed examples of different steps of method 2600. Method 2600 will now be described in more detail with reference to FIGS. 22-25.

At step 2602, a sequence of images is obtained. In some embodiments, the sequence of images may be multiple snapshots and/or video captured (2604) along a camera translation. In some embodiments, the captured image may include 2D images, such as 2D images 104. In some embodiments, other data may also be obtained from the camera and/or user, including location information, IMU information, and depth information. In some embodiments, each image in the sequence of images contains (2606) at least a portion of overlapping subject matter. In some embodiments, the subject matter includes (2608) an object, such as a car (or an image of a car).

At step 2610, a multi-view interactive digital media representation (MIDMR) of the object is generated. For example, the images and other data captured in step 2201 may be fused together at a sensor fusion block, such as sensor fusion block 110 as previously described with reference to FIG. 1. In some embodiments, the data that has been fused together may then be used for content modeling (e.g., the object) and/or context modeling (e.g., the background), as discussed with reference to content modeling 112 and context modeling 114, respectively, in FIG. 1. In some embodiments, the MIDMR includes (2612) a plurality of views of the object. In such embodiments, each view includes (2614) a camera angle. As previously described with reference to block 116 in FIG. 1, various enhancement algorithms may be employed to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data. In some embodiments, the enhancement algorithms may be applied during a subsequent step, such as at step 2211, described below.

Figure 22A:
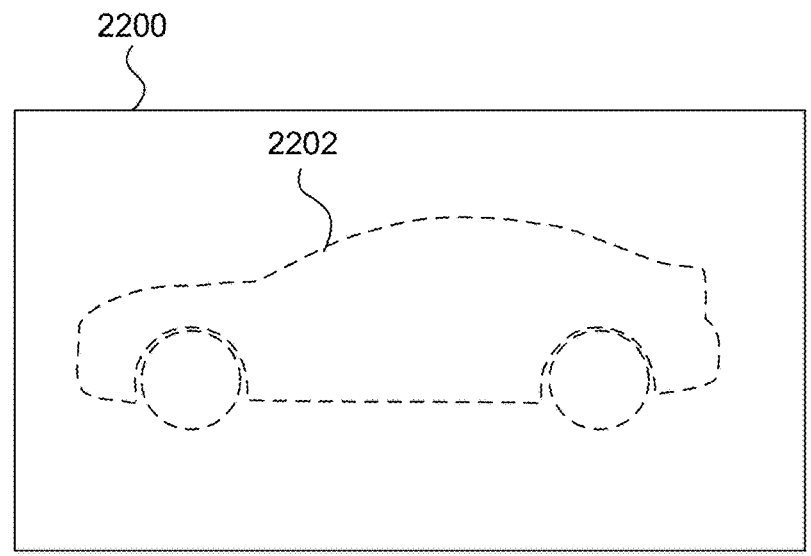
FIGS. 22A-C illustrate an example of segmentation and refined segmentation to generate a segmented object, in accordance with one or more embodiments.
Figure 22B:
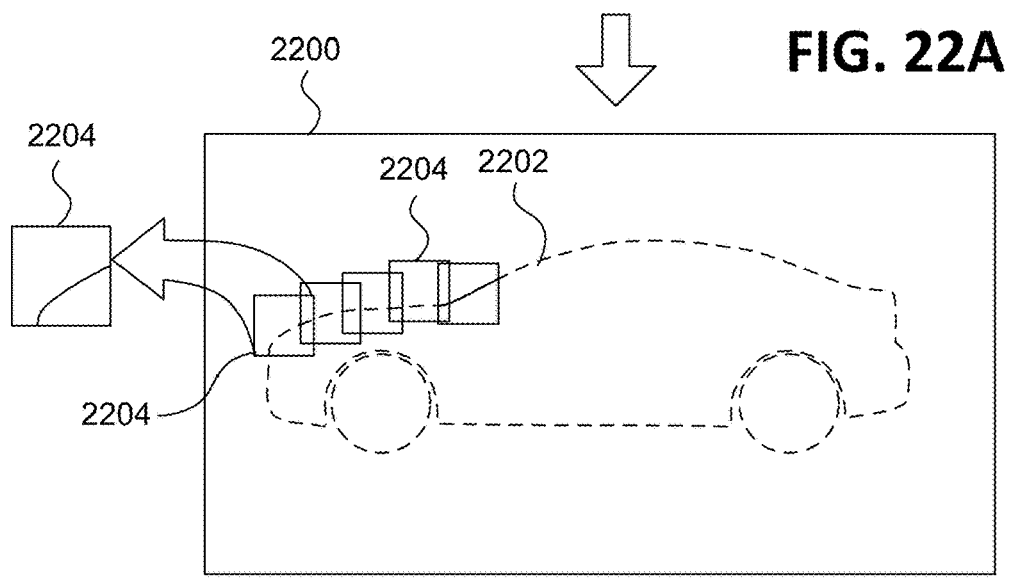
Figure 22C:
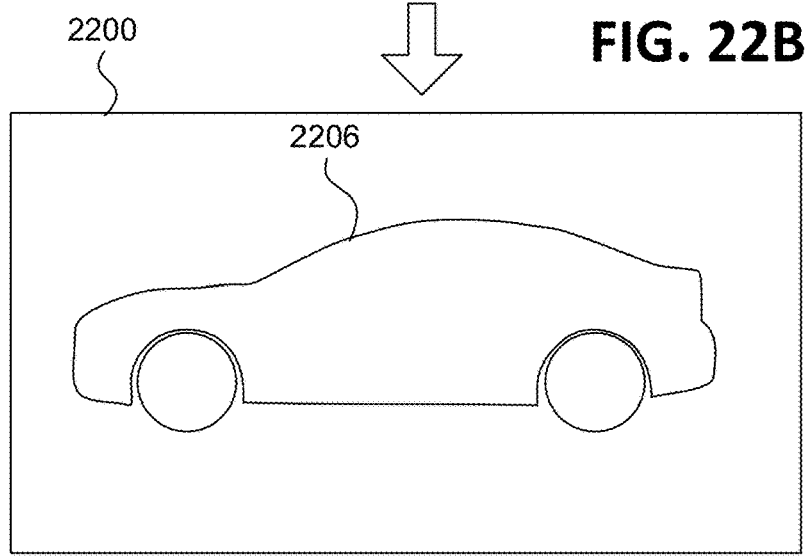

In some embodiments, generating the MIDMR includes, for each view (2616), apply a post-processing artificial motion blur effect. At step 2618, the object from an image corresponding to the view is semantically segmented, thereby forming a segmented object. In some embodiments, the object is a car. In some embodiments, semantically segmenting the object from an image corresponding to the view is done using a trained neural network. For example, FIG. 22A depicts segmented object 2202, in the shape of a car, in image 2200. In some embodiments, such a segmentation results in a rough segmented object. For example, segmented object 2202 is a rough segmentation object, as denoted by the "segmented" lines. At step 2620, the segmented object is refined using fine-grained segmentation. For example, FIG. 22C depicts "smoothed" segmented object 2206. In some embodiments, refining the segmented object is performed using segmentation windows along an outline of the object. For example, FIG. 22B depicts smooth segmentation windows 2204 used to refine rough segmented object 2202, resulting in smooth segmented object 2206.

Figure 23A:
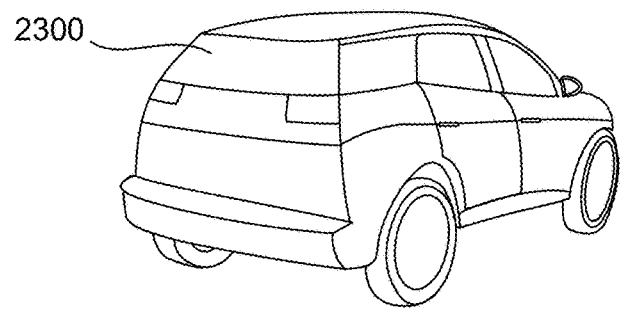
FIGS. 23A-G illustrate steps of an example process for applying the motion blur effect to an MIDMR, in accordance with one or more embodiments.
Figure 23B:
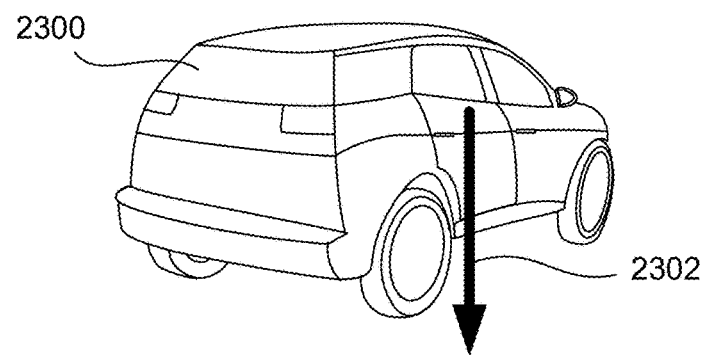
Figure 23C:
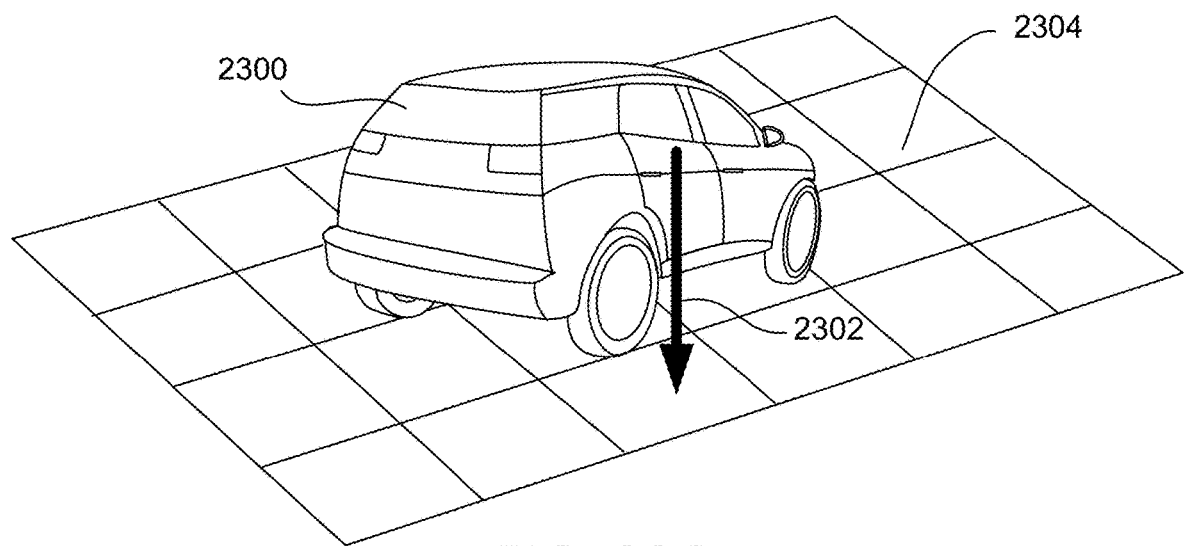
Figure 23D:
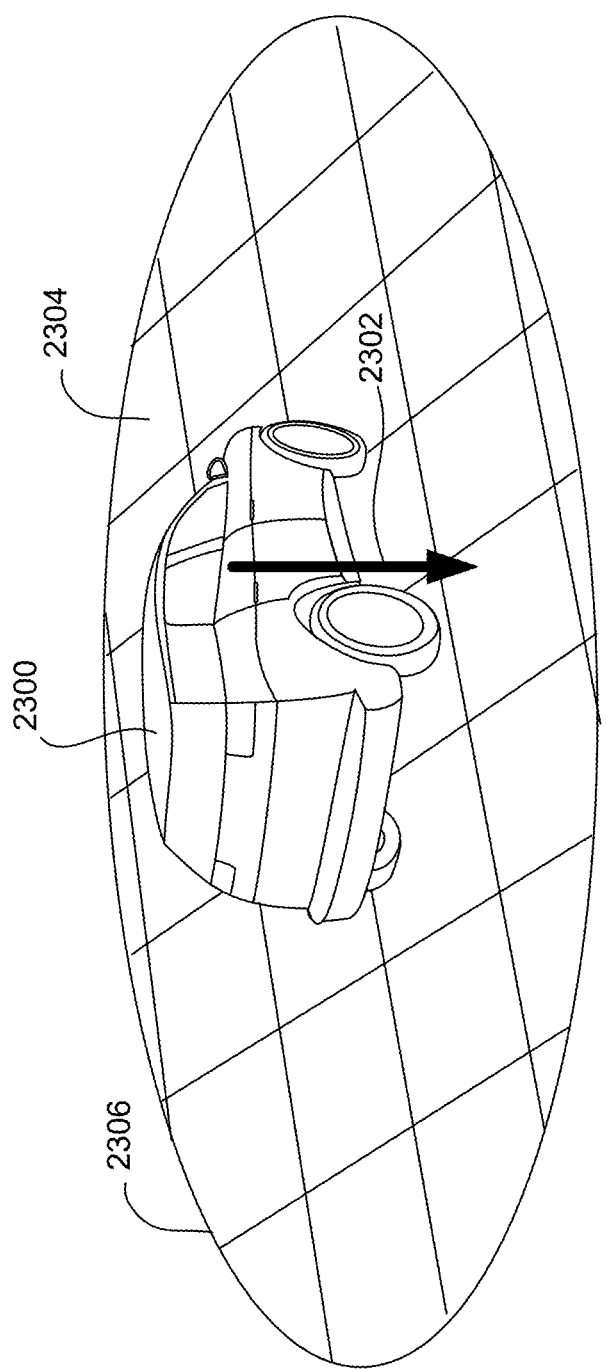

At step 2622, a gravity vector for the segmented object is computed. For example, FIG. 23B depicts a car 2300 and a gravity vector 2302. In some embodiments, the gravity vector is computed using IMU data from a still photo. At 2624, a ground plane of the segmented object is determined using the gravity vector. In some embodiments, the ground plane is the plane that is perpendicular to the gravity vector. For example, FIG. 23C depicts a ground plane 2304 generated using gravity vector 2302. At 2626, a circle is drawn on the ground plane using a predetermined radius around the central point of object (car) 2300. For example, FIG. 23D depicts circle 2306 drawn on ground plane 2304. In some embodiments, the purpose of the circle is to determine a blur center along the edge of the circle. A blur center is the center where the blur effect is to be applied. The closer the pixels in the image to the blur center, the less of a "blur" effect is applied, and vice versa. If the blur center is too close to the object, the car no longer looks like it is moving in the right direction. If the blur center is too far, a viewer can only see the blur center when the view angle is exactly 90 degrees. Thus, in some embodiments, the predetermined radius is determined empirically. In some embodiments, the radius distance is chosen such that the blur center is still visible in the camera when the camera has made a ⅛ (around 45 degrees) of a circle around the car from the front to the back.

Figure 23E:
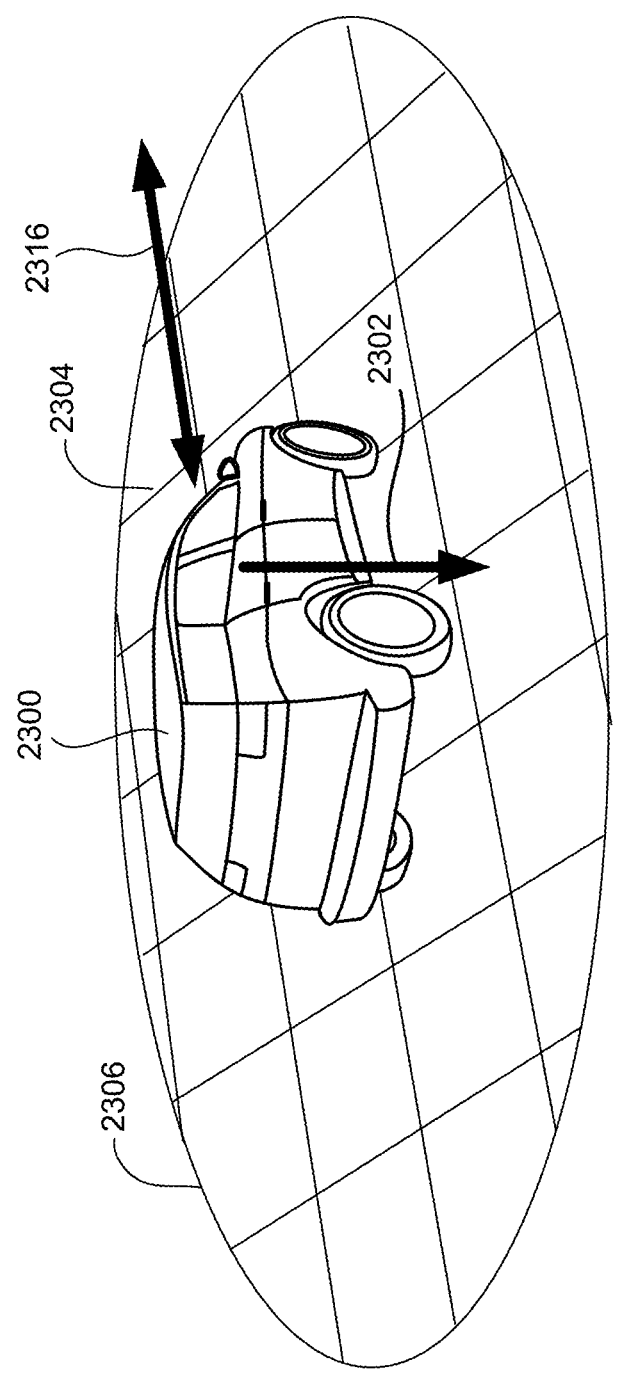
Figure 23F:
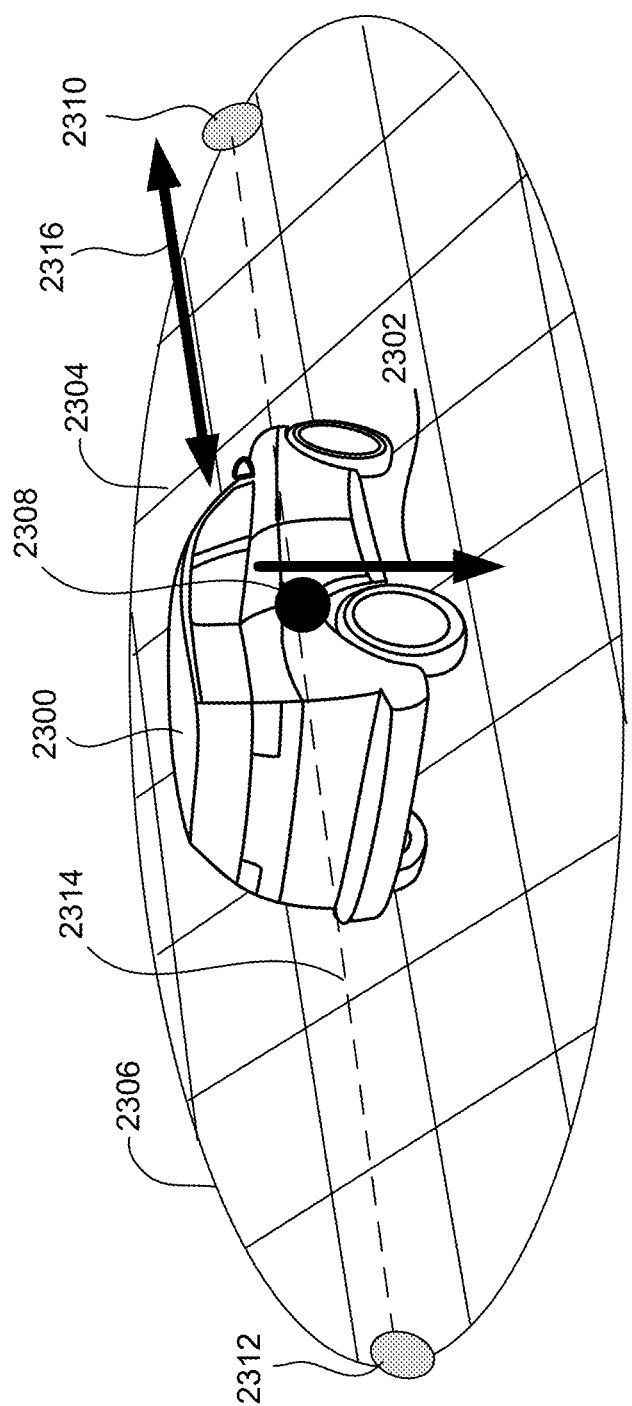
Figure 23G:
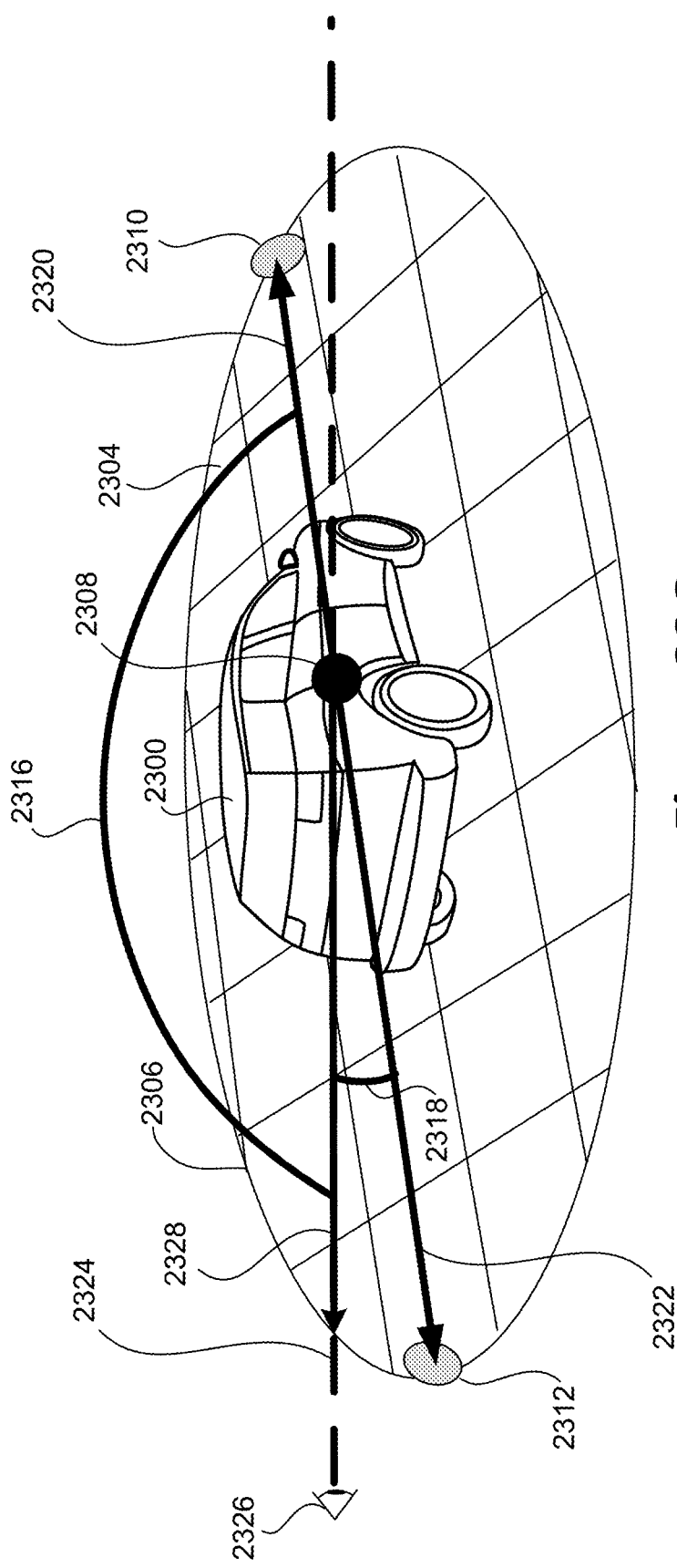

At 2628, a directionality of the segmented object is defined. For example, FIG. 23E shows directionality 2316. In some embodiments, the directionality is determined using wheels or any part of the skeleton. In some embodiments, this includes: 1) determining a 3D line passing from back to front using wheel or skeleton coordinates, and 2) computing the angle of a second line from the estimated camera center to the point on the first line that marks the center of the car. In some embodiments, the directionality is determined using a trained neural network. In some embodiments, this includes using a deep convolutional neural network with custom regression layers at the output to regress the car orientation. In some embodiments, the training data is manually created by labeling front, back, and sides of the car and assuming linear behavior of the orientations in between. At 2630, two blur center candidates are selected along the 3D circle. In some embodiments, each blur center candidate is located along a line that passes through the center of the segmented object and is parallel to the directionality of the segmented object. For example, FIG. 23F depicts two blur center candidates 2310 and 2312 located along circle 2306. Both blur center candidates intersect with midline 2314 which runs through the center 2308 of car 2300 and is parallel to directionality 2316. In some embodiments, the center of the car is calculated using the "mass" of the segmented pixels of the segmented object. In some embodiments, the "mass" refers to the center of mass of the pixels masked as foreground or the average pixel position of all pixels labeled as foreground. At 2632, a blur center is chosen among the two blur center candidates based on a predetermined criteria. In some embodiments, choosing the blur center includes choosing the blur center candidate with the smallest angle difference between a vector from the center of the segmented object to the blur center candidate and the camera angle of the view. For example, FIG. 23G depicts two angles, 2316 and 2318, corresponding to blur center candidates 2310 and 2312, respectively. Angle 2316 is formed between vector 2320 and vector 2328, which starts from center 2308 and goes outward toward camera angle 2326 along camera line of sight 2324. Angle 2318 is formed between vector 2322 and vector 2328. In this particular example, blur center candidate 2312 is chosen as the blur center because it has the smallest angle difference between its corresponding vector and the camera angle. At 2634, a blur effect is applied along the directionality of the segmented object to every part of the view except where the segmented object. In some embodiments, this includes: 1) determining a line that passes through a pixel position and the blur center, 2) determining a sampling range around the pixel position along the line using the distance from the blur center and an empirically defined scaling factor further away, 3) sampling points in fixed, regular distances in both directions from the pixel position along the line and collecting their RGB values, and 4) setting the RGB value at the pixel position to the average RGB values of the sampled points. In some embodiments, the blur effect is applied radially from the blur center because sampling is done on the line going from the blur center to the pixel position.

Figure 24:
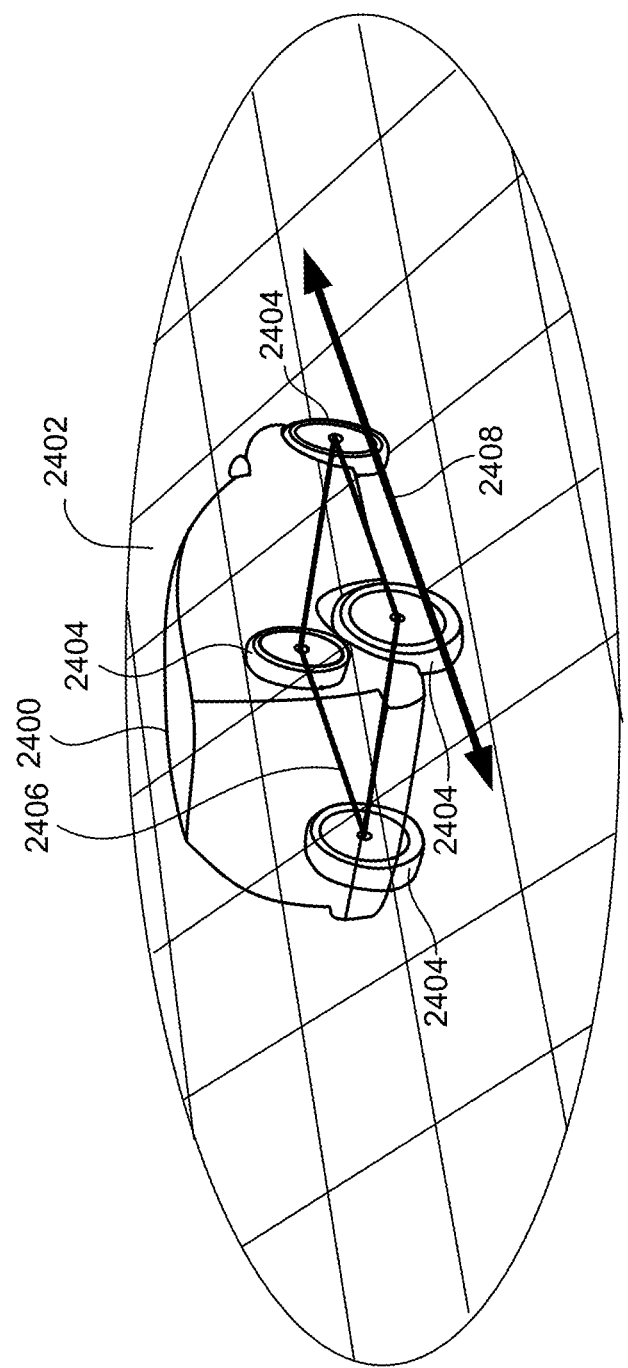
FIG. 24 illustrates an example of an alternative method for determining directionality without using a gravity vector, in accordance with one or more embodiments.

In some embodiments, the directionality of the segmented object is determined by first generating a skeleton of the segmented object and then using a portion of the skeleton to find the directionality. For example, FIG. 24 depicts a skeleton of a car 2400. Skeleton 2400 also includes four wheels 2404. FIG. 24 illustrates lines connecting all four wheels 2404, which is then used to determined the ground plane 2402 of the car and also to find the directionality 2408 of the car. In some embodiments, the directionality of the segmented object is determined by using a trained neural network. In some embodiments, an additional method for computing the location of the blur center includes: 1) estimating the locations of the wheels in the images, 2) given that there are 3D poses for every frame, triangulating the 3D location of all wheels in 3D space, and 3) using the wheels to infer the location of the blur center in 3D space. In some embodiments, this can be done by computing the average point of the front wheel centers and the average point of the back wheel centers. The direction of the car can be determined from the vector between the average back wheel center point and the average front wheel center point. Last, the 2 blur centers can be obtained by adding and subtracting that direction vector to the average point of all 4 wheels.

Figure 25A:
FIGS. 25A and 25B are before and after screenshots of an example of the motion blur effect being applied, in accordance with one or more embodiments.
Figure 25B:
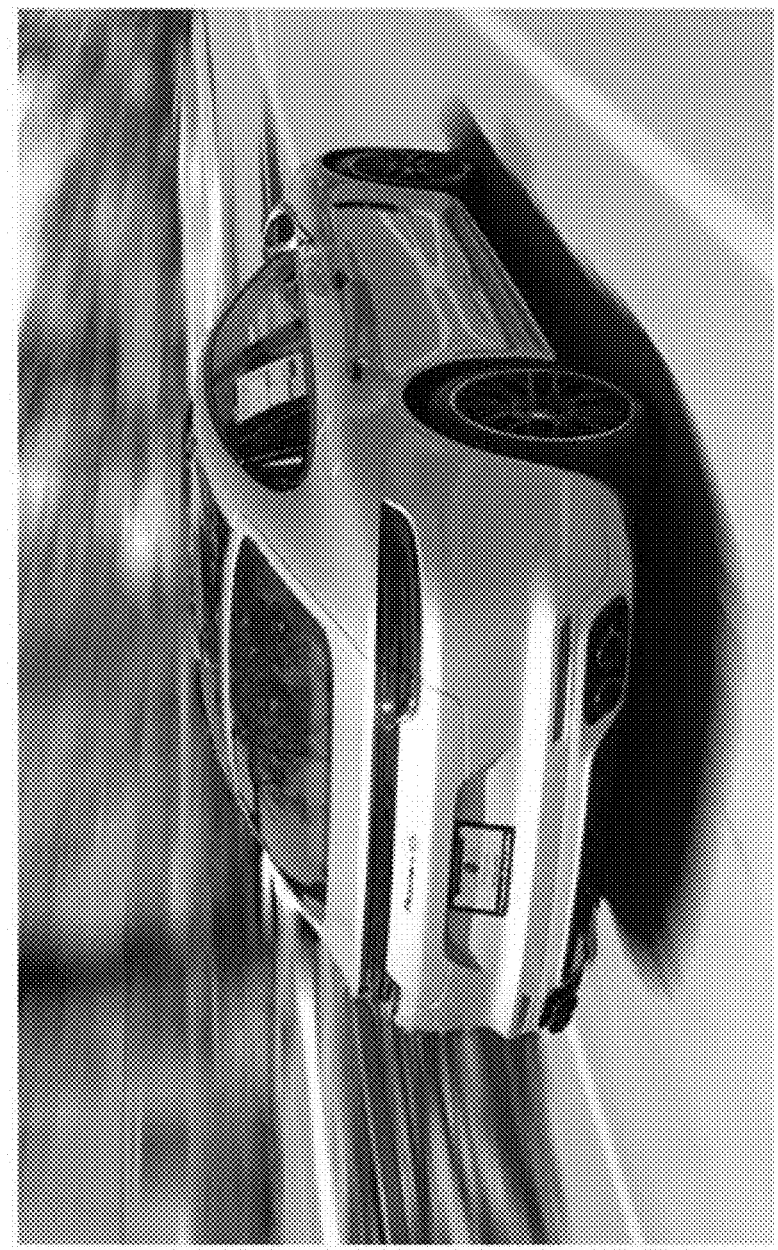
Figure 26A:
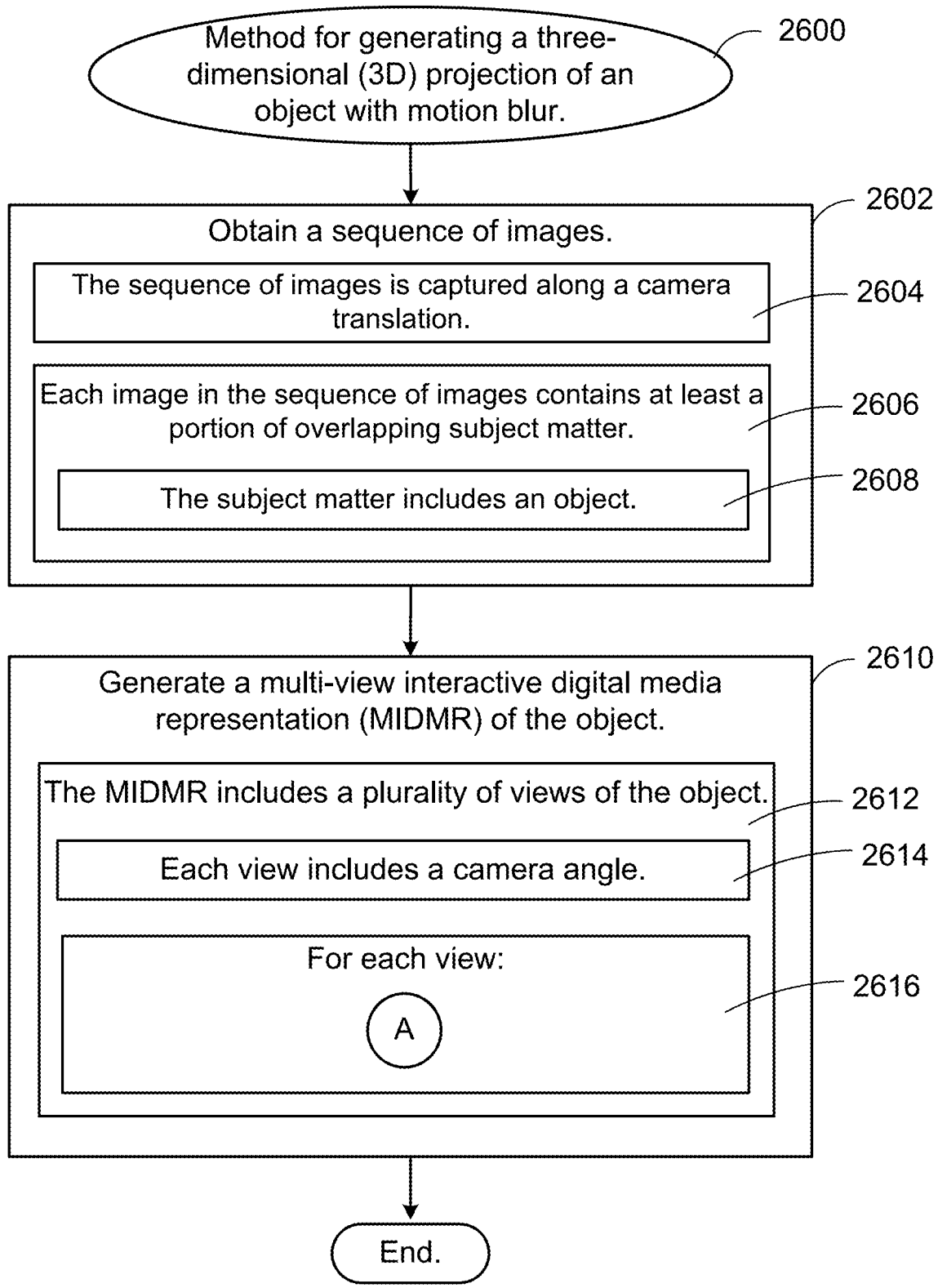
FIGS. 26A-26B illustrate an example of a method for generating a three-dimensional (3D) projection of an object with artificial motion blur, in accordance with one or more embodiments.
Figure 26B:
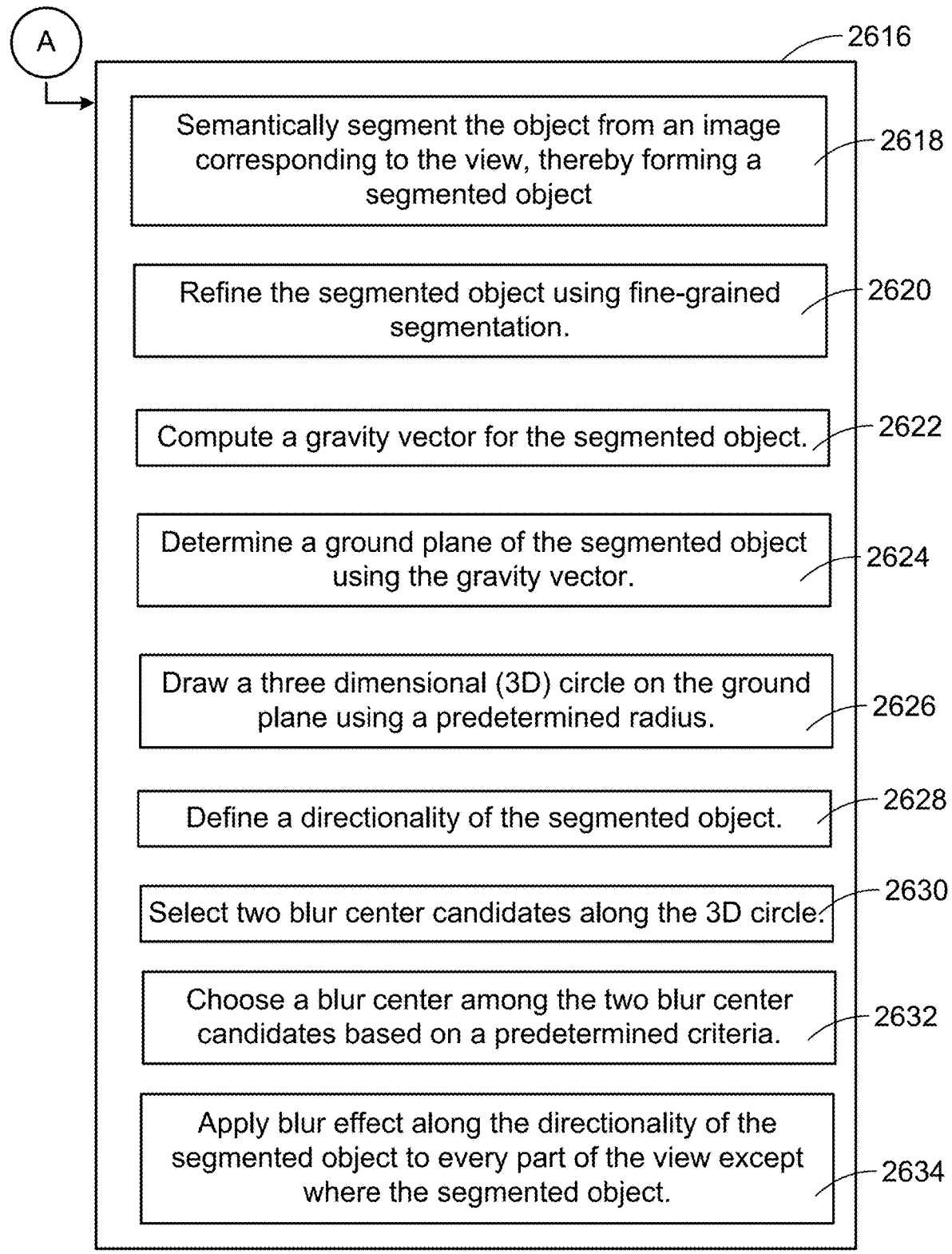

FIG. 25A depicts a screenshot of one view of an MIDMR before the motion blur effect is applied. FIG. 25B depicts a screenshot of the same view of the MIDMR but after the motion blur effect is applied. The systems and methods presented herein for automatic generation of a motion blur effect provide many advantages. For example, the motion blur effect can be applied post capture and post processing. This is an improvement over traditional methods because only one set of images for an MIDMR need to be stored, and yet still images and "moving" images may be presented. In addition, a traditional graphical user interface (GUI) would only simply have the ability to present still or "moving" images. However, in some embodiments, the system includes a GUI on a client device that applies the motion blur effect to a still image. Thus, the GUI is improved by the addition of a new function and capability.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Various computing devices can implement the methods described. For instance, a mobile device, computer system, etc. can be used to generate artificially rendered images. With reference to FIG. 27, shown is a particular example of a computer system that can be used to implement particular examples of the present disclosure. For instance, the computer system 2700 can be used to provide surround views according to various embodiments described above. According to particular example embodiments, a system 2700 suitable for implementing particular embodiments of the present disclosure includes a processor 2701, a memory 2703, an interface 2711, and a bus 2715 (e.g., a PCI bus). The interface 2711 may include separate input and output interfaces, or may be a unified interface supporting both operations. When acting under the control of appropriate software or firmware, the processor 2701 is responsible for such tasks such as optimization. Various specially configured devices can also be used in place of a processor 2701 or in addition to processor 2701. The complete implementation can also be done in custom hardware. The interface 2711 is typically configured to send and receive data packets or data segments over a network. Particular examples of interfaces the device supports include Ethernet interfaces, frame relay interfaces, cable interfaces, DSL interfaces, token ring interfaces, and the like. In some embodiments, the interface 2711 includes a Graphical User Interface (GUI) capable of presenting an MIDMR with motion blur effect.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2700 uses memory 2703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for generating a three-dimensional (3D) projection of an object with motion blur, the method comprising:
    obtaining a sequence of images, the sequence of images being captured along a camera translation and rotation, wherein each image in the sequence of images contains at least a portion of overlapping subject matter, the subject matter including an object; and
    generating a multi-view interactive digital media representation (MIDMR) of the object, the MIDMR including a plurality of views of the object, each view including a camera angle, wherein generating the MIDMR includes, for each view of the MIDMR:
        semantically segmenting the object from an image corresponding to the view, thereby forming a segmented object;
        determining a ground plane of the segmented object;
        estimating a circle on the ground plane using a predetermined radius;
        defining a directionality of the segmented object;
        selecting two blur center candidates along the circle;
        choosing a blur center among the two blur center candidates based on a predetermined criteria; and
        applying a blur effect away from the selected blur center to every part of the view except where the segmented object is located.

2. The method of claim 1, wherein each blur center candidate is located along a line that passes through the center of the segmented object and is parallel to the directionality of the segmented object.

3. The method of claim 1, wherein choosing the blur center includes choosing the blur center candidate with the smallest angle difference between a vector from the center of the segmented object to the blur center candidate and the camera angle of the view.

4. The method of claim 1, wherein the predetermined radius is determined by one of the following methods: determined empirically, determined relative to the size of the object, determined to reflect a fixed physical size of the object, and determined as an average desired radius.

5. The method of claim 1, wherein semantically segmenting the object from an image corresponding to the view is done using a trained neural network.

6. The method of claim 1, further comprising refining the segmented object using segmentation windows along an outline of the object.

7. The method of claim 1, wherein the ground plane is estimated using a gravity vector obtained from IMU data.

8. The method of claim 1, wherein the directionality of the segmented object is determined by first generating a skeleton of the segmented object and then using a portion of the skeleton to find the directionality.

9. The method of claim 1, wherein the directionality of the segmented object is determined by using a trained neural network.

10. The method of claim 1, wherein the object is a car and the directionality is determined by using dominant features of the car such as two or more wheels of the car or two or more lights of the car.

11. A system for generating a three-dimensional (3D) projection of an object with motion blur, the system comprising:
a processor, and
memory storing one or more programs configured for execution by the processor, the one or more programs comprising instructions for:
obtaining a sequence of images, the sequence of images being captured along a camera translation and rotation, wherein each image in the sequence of images contains at least a portion of overlapping subject matter, the subject matter including an object; and
generating a multi-view interactive digital media representation (MIDMR) of the object, the MIDMR including a plurality of views of the object, each view including a camera angle, wherein generating the MIDMR includes, for each view of the MIDMR:
semantically segmenting the object from an image corresponding to the view, thereby forming a segmented object;
determining a ground plane of the segmented object;
estimating a circle on the ground plane using a predetermined radius;
defining a directionality of the segmented object;
selecting two blur center candidates along the circle;
choosing a blur center among the two blur center candidates based on a predetermined criteria; and
applying a blur effect away from the selected blur center to every part of the view except where the segmented object is located.

12. The system of claim 11, wherein each blur center candidate is located along a line that passes through the center of the segmented object and is parallel to the directionality of the segmented object.

13. The system of claim 11, wherein choosing the blur center includes choosing the blur center candidate with the smallest angle difference between a vector from the center of the segmented object to the blur center candidate and the camera angle of the view.

14. The system of claim 11, wherein the predetermined radius is determined by one of the following methods: determined empirically, determined relative to the size of the object, determined to reflect a fixed physical size of the object, and determined as an average desired radius.

15. The system of claim 11, wherein semantically segmenting the object from an image corresponding to the view is done using a trained neural network.

16. The system of claim 11, wherein the instructions further comprise refining the segmented object using segmentation windows along an outline of the object.

17. The system of claim 11, wherein the ground plane is estimated using a gravity vector obtained from IMU data.

18. The system of claim 11, wherein the directionality of the segmented object is determined by first generating a skeleton of the segmented object and then using a portion of the skeleton to find the directionality.

19. The system of claim 11, wherein the directionality of the segmented object is determined by using a trained neural network.

20. A non-transitory computer readable medium storing one or more programs configured for execution by a computer, the one or more programs comprising instructions for:
obtaining a sequence of images, the sequence of images being captured along a camera translation and rotation, wherein each image in the sequence of images contains at least a portion of overlapping subject matter, the subject matter including an object; and
generating a multi-view interactive digital media representation (MIDMR) of the object, the MIDMR including a plurality of views of the object, each view including a camera angle, wherein generating the MIDMR includes, for each view of the MIDMR:
semantically segmenting the object from an image corresponding to the view, thereby forming a segmented object;
determining a ground plane of the segmented object;
estimating a circle on the ground plane using a predetermined radius;
defining a directionality of the segmented object;
selecting two blur center candidates along the circle;
choosing a blur center among the two blur center candidates based on a predetermined criteria; and
applying a blur effect away from the selected blur center to every part of the view except where the segmented object is located.

* * * * *